(12) United States Patent
Roy et al.

(10) Patent No.: US 11,739,641 B1
(45) Date of Patent: Aug. 29, 2023

(54) METHOD FOR PROCESSING THE OUTPUT OF A SPEECH RECOGNIZER

(71) Applicant: Great Northern Research LLC, Vero Beach, FL (US)

(72) Inventors: Philippe Roy, Ontario (CA); Paul J. Lagassey, Vero Beach, FL (US)

(73) Assignee: Great Northern Research, LLC, Vero Beach, FL (US)

( * ) Notice: Subject to any disclaimer, the term of this patent is extended or adjusted under 35 U.S.C. 154(b) by 136 days.

(21) Appl. No.: 17/229,567

(22) Filed: Apr. 13, 2021

Related U.S. Application Data

(63) Continuation of application No. 15/799,935, filed on Oct. 31, 2017, now Pat. No. 10,978,074, which is a
(Continued)

(51) Int. Cl.
  *G10L 15/16*   (2006.01)
  *F01D 5/02*    (2006.01)
  (Continued)

(52) U.S. Cl.
  CPC ............. *F01D 5/02* (2013.01); *F01D 5/3015* (2013.01); *G06F 40/205* (2020.01); *G06F 40/216* (2020.01); *G06F 40/289* (2020.01); *G10L 15/14* (2013.01); *G10L 15/16* (2013.01); *G10L 15/1815* (2013.01); *G10L 15/19* (2013.01); *G10L 15/22* (2013.01); *G10L 15/285* (2013.01);
  (Continued)

(58) Field of Classification Search
  CPC ......... G10L 15/19; G10L 15/22; G10L 15/26; G10L 15/14; G10L 15/16; G10L 15/1815; G10L 15/285; G10L 2015/223; G10L 15/063; G10L 15/24; G06F 40/289; G06F 40/216; G06F 40/205; G06F 40/40; G06F 40/274; G06F 40/247; G06F 40/242
  See application file for complete search history.

(56) References Cited

U.S. PATENT DOCUMENTS

| 5,241,619 A | * | 8/1993 | Schwartz | ............... G10L 15/08 704/200 |
| 5,893,059 A | * | 4/1999 | Raman | ................. G10L 15/063 704/256.2 |

(Continued)

*Primary Examiner* — Vijay B Chawan
(74) *Attorney, Agent, or Firm* — Hoffberg & Associates; Steven M. Hoffberg

(57) ABSTRACT

A method for processing speech, comprising semantically parsing a received natural language speech input with respect to a plurality of predetermined command grammars in an automated speech processing system; determining if the parsed speech input unambiguously corresponds to a command and is sufficiently complete for reliable processing, then processing the command; if the speech input ambiguously corresponds to a single command or is not sufficiently complete for reliable processing, then prompting a user for further speech input to reduce ambiguity or increase completeness, in dependence on a relationship of previously received speech input and at least one command grammar of the plurality of predetermined command grammars, reparsing the further speech input in conjunction with previously parsed speech input, and iterating as necessary. The system also monitors abort, fail or cancel conditions in the speech input.

20 Claims, 6 Drawing Sheets

Related U.S. Application Data continuation of application No. 14/940,253, filed on Nov. 13, 2015, now Pat. No. 9,805,723, which is a continuation of application No. 14/921,780, filed on Oct. 23, 2015, now Pat. No. 9,753,912, which is a continuation of application No. 14/445,096, filed on Jul. 29, 2014, now Pat. No. 9,502,027, which is a continuation of application No. 13/543,924, filed on Jul. 9, 2012, now Pat. No. 8,793,137, which is a continuation of application No. 12/241,037, filed on Sep. 30, 2008, now Pat. No. 8,219,407.

(60) Provisional application No. 61/017,121, filed on Dec. 27, 2007.

(51) Int. Cl.

| | | |
|---|---|---|
| *G06F 40/205* | (2020.01) | |
| *G06F 40/289* | (2020.01) | |
| *G06F 40/216* | (2020.01) | |
| *G10L 15/14* | (2006.01) | |
| *G10L 15/18* | (2013.01) | |
| *G10L 15/19* | (2013.01) | |
| *G10L 15/22* | (2006.01) | |
| *G10L 15/28* | (2013.01) | |
| *G10L 15/34* | (2013.01) | |
| *H04L 12/28* | (2006.01) | |
| *F01D 5/30* | (2006.01) | |

(52) U.S. Cl.
CPC ............ *G10L 15/34* (2013.01); *H04L 12/282* (2013.01); *F05D 2220/32* (2013.01); *F05D 2260/941* (2013.01); *G10L 2015/223* (2013.01); *H04L 2012/2847* (2013.01)

(56) References Cited

U.S. PATENT DOCUMENTS

| | | | | |
|---|---|---|---|---|
| 6,073,101 | A * | 6/2000 | Maes | G10L 15/065 |
| | | | | 704/E17.011 |
| 7,120,582 | B1 * | 10/2006 | Young | G10L 15/063 |
| | | | | 704/243 |
| 7,203,643 | B2 * | 4/2007 | Garudadri | G10L 15/30 |
| | | | | 704/E15.047 |
| 7,720,682 | B2 * | 5/2010 | Stephanick | G06V 30/1423 |
| | | | | 704/252 |
| 8,165,886 | B1 * | 4/2012 | Gagnon | G10L 15/19 |
| | | | | 715/728 |
| 8,219,407 | B1 * | 7/2012 | Roy | G06F 40/205 |
| | | | | 704/275 |
| 8,543,407 | B1 * | 9/2013 | Gagnon | G10L 17/22 |
| | | | | 704/275 |
| 8,560,318 | B2 * | 10/2013 | Hernandez-Abrego | ............ |
| | | | | G10L 15/19 |
| | | | | 704/254 |
| 8,793,137 | B1 * | 7/2014 | Roy | G10L 15/34 |
| | | | | 704/275 |
| 8,996,375 | B1 * | 3/2015 | Gagnon | G10L 17/22 |
| | | | | 704/275 |
| 9,189,197 | B1 * | 11/2015 | Lagassey | G06F 9/451 |
| 9,502,027 | B1 * | 11/2016 | Roy | G06F 40/289 |
| 2004/0148170 | A1 * | 7/2004 | Acero | G06F 40/216 |
| | | | | 704/257 |
| 2004/0199375 | A1 * | 10/2004 | Ehsani | G06F 40/40 |
| | | | | 704/E15.04 |
| 2007/0198267 | A1 * | 8/2007 | Jones | H04M 3/4936 |
| | | | | 707/E17.062 |
| 2009/0024391 | A1 * | 1/2009 | Grant | G06F 3/167 |
| | | | | 704/E15.005 |
| 2009/0052635 | A1 * | 2/2009 | Jones | H04M 3/4936 |
| | | | | 704/E15.001 |

* cited by examiner

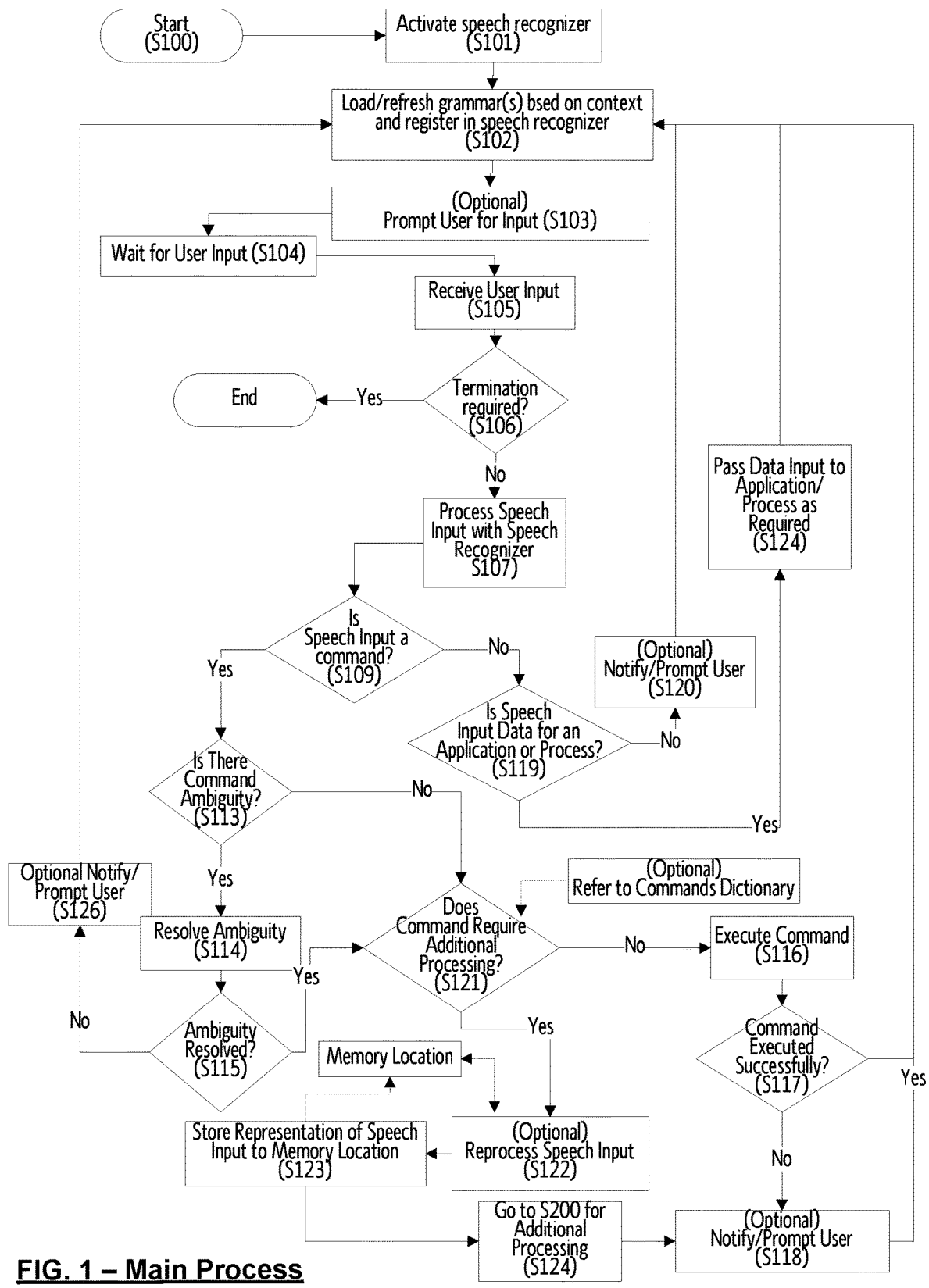
FIG. 1 – Main Process

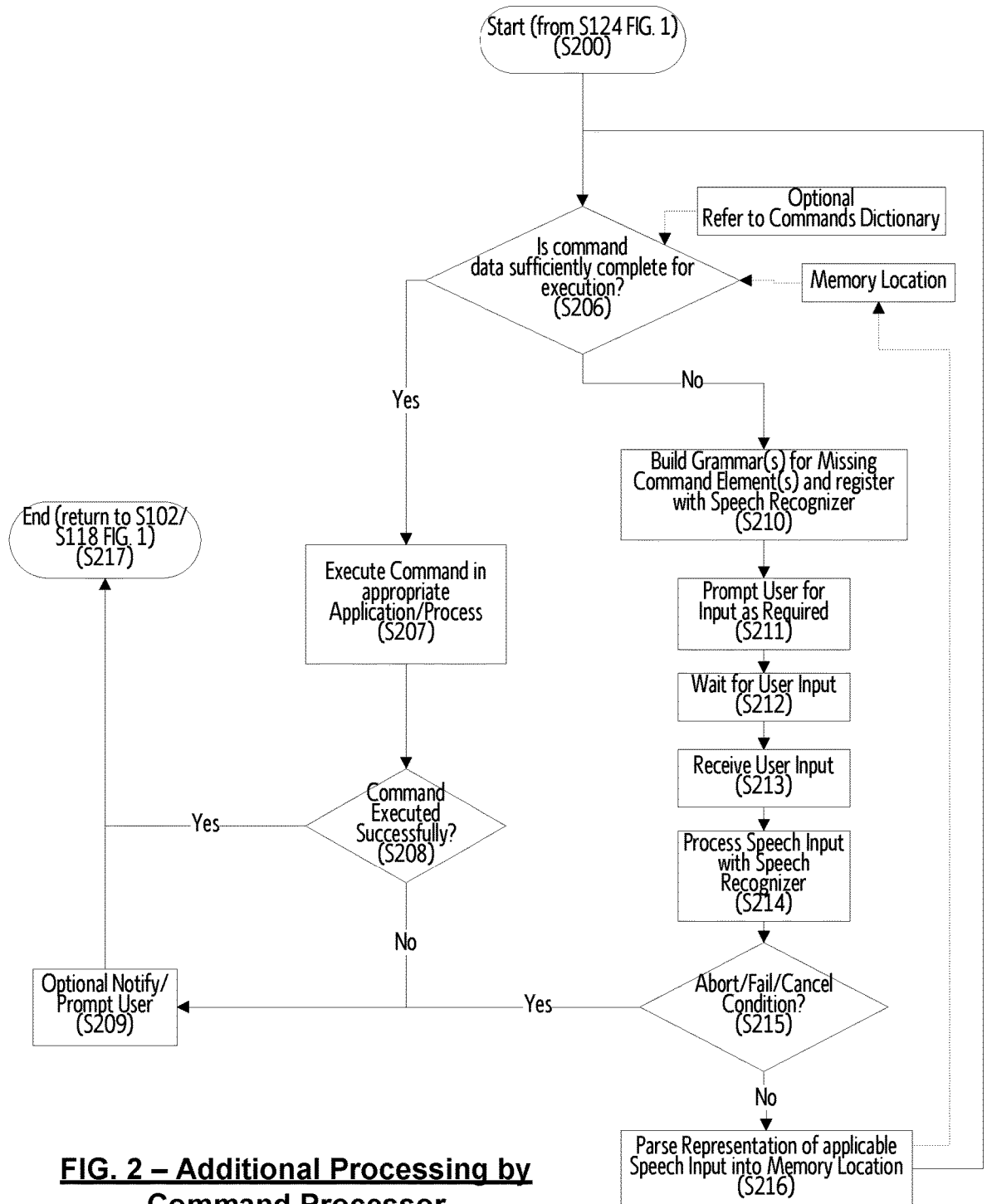
FIG. 2 – Additional Processing by Command Processor

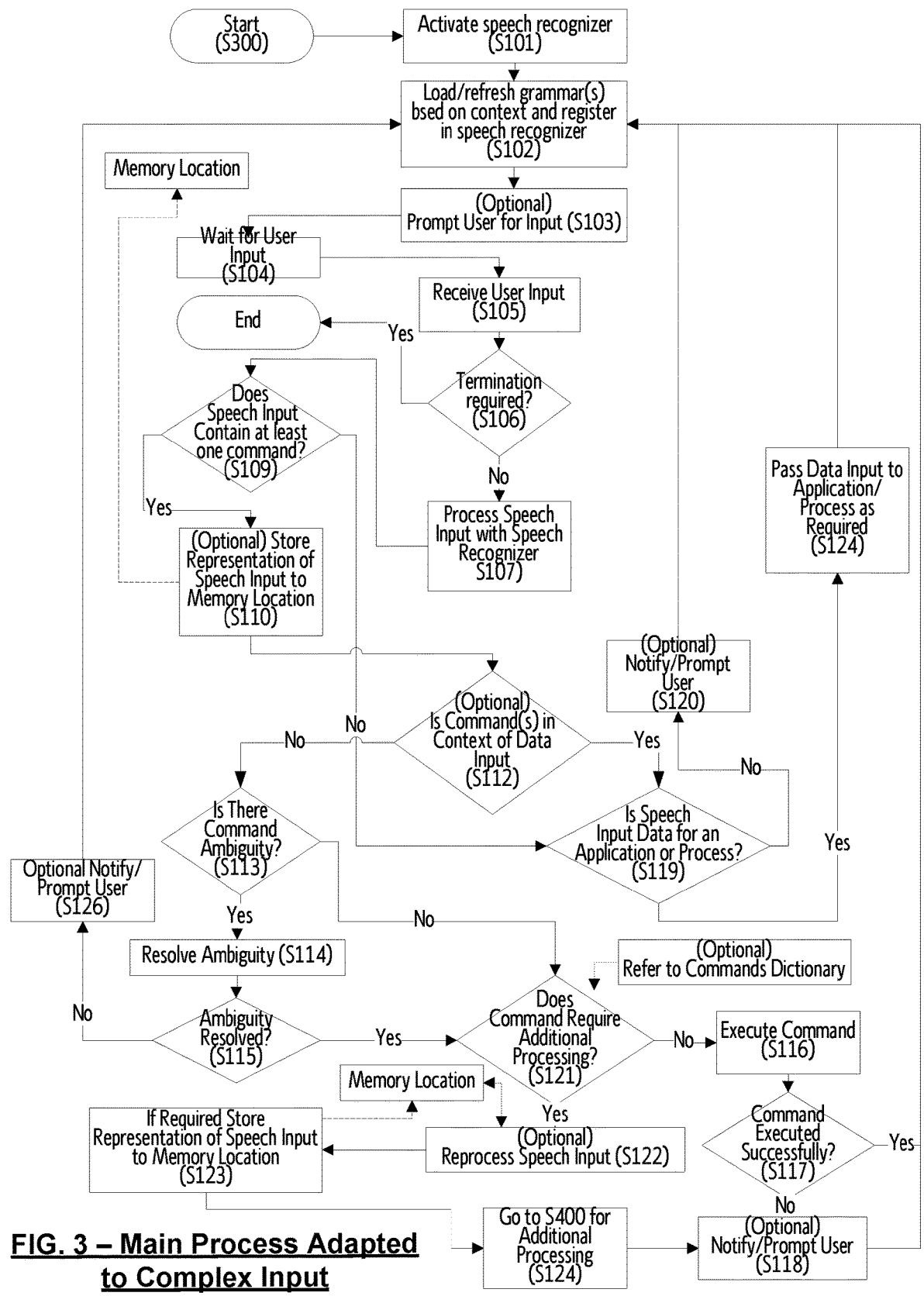
FIG. 3 – Main Process Adapted to Complex Input

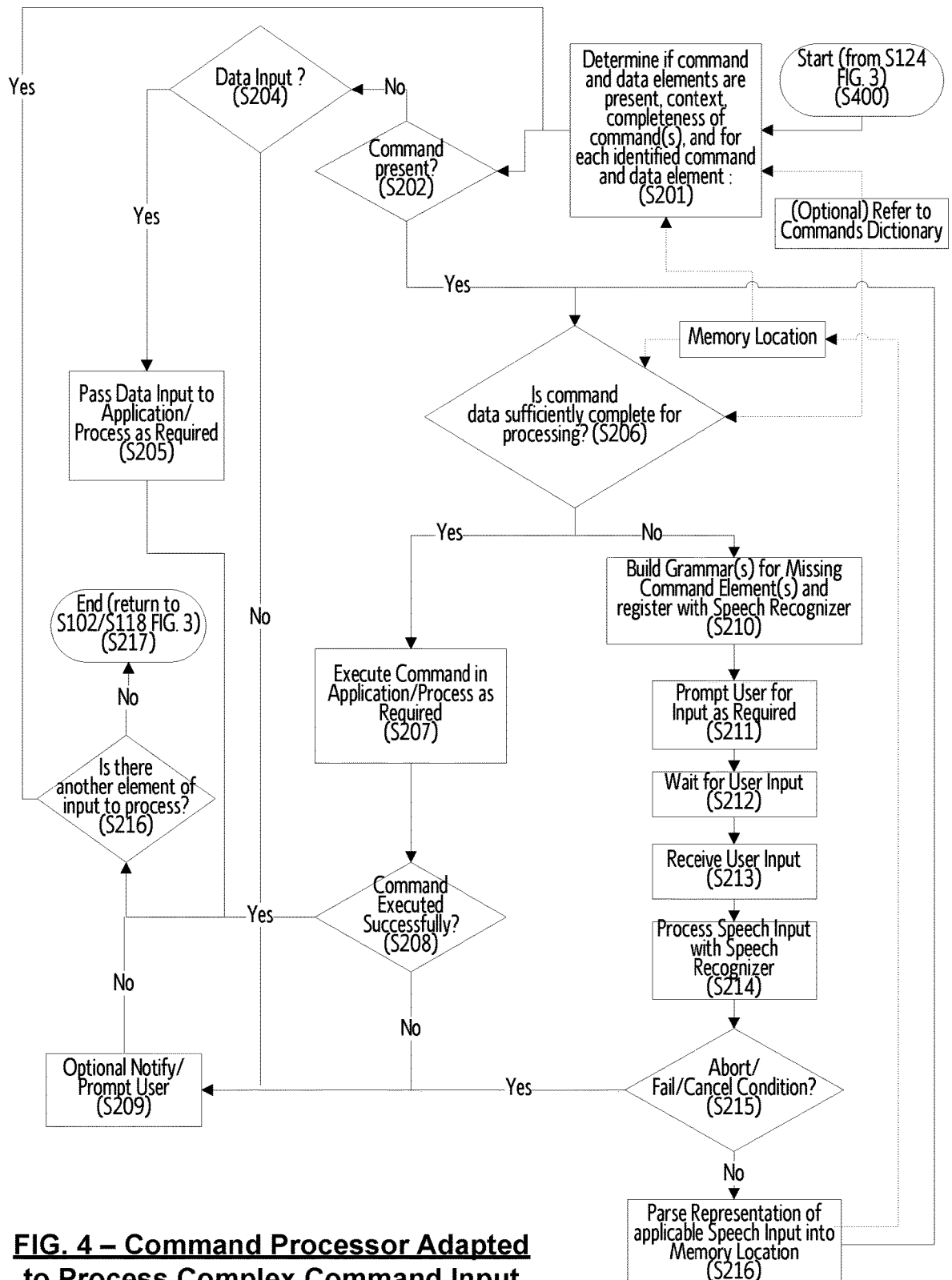
FIG. 4 – Command Processor Adapted to Process Complex Command Input

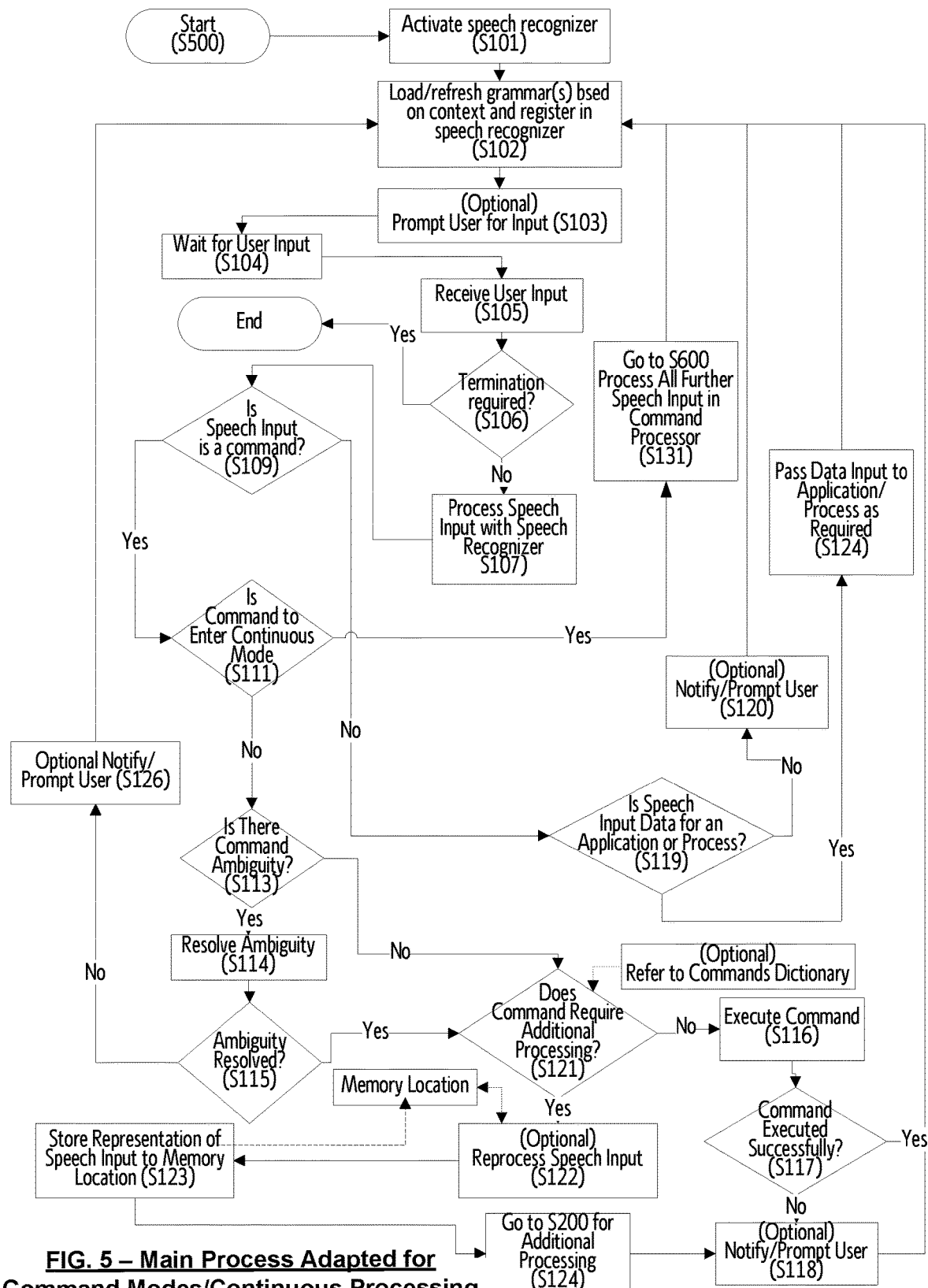
FIG. 5 – Main Process Adapted for Command Modes/Continuous Processing

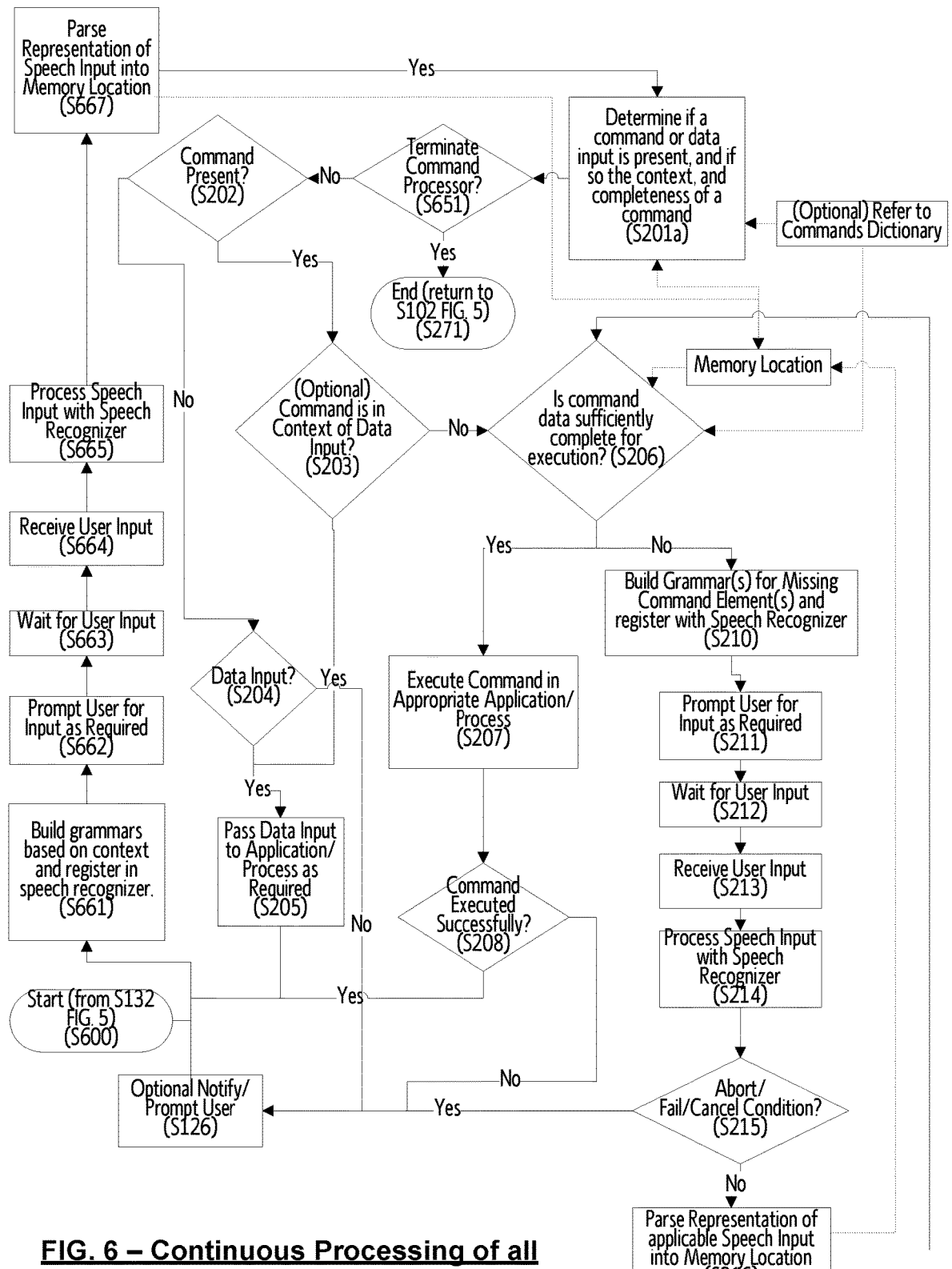
FIG. 6 – Continuous Processing of all Speech Input by Command Processor

METHOD FOR PROCESSING THE OUTPUT OF A SPEECH RECOGNIZER

CROSS-REFERENCE TO RELATED APPLICATIONS

The present application is a:

Continuation of U.S. patent application Ser. No. 15/799,935, filed Oct. 31, 2017, now U.S. Pat. No. 10,978,074, issued Apr. 13, 2021, which is a Continuation of U.S. patent application Ser. No. 14/940,253, filed Nov. 13, 2015, now U.S. Pat. No. 9,805,723, issued Oct. 31, 2017, which is a Continuation of U.S. patent application Ser. No. 14/921,780, filed Oct. 23, 2015, now U.S. Pat. No. 9,753,912, issued Sep. 5, 2017, which is a Continuation of U.S. patent application Ser. No. 14/445,096, filed Jul. 29, 2014, now U.S. Pat. No. 9,502,026, issued Nov. 22, 2016, which is a Continuation of U.S. patent application Ser. No. 13/543,924, filed Jul. 9, 2012, now U.S. Pat. No. 8,793,137, issued Jul. 29, 2014, which is a Continuation of U.S. patent application Ser. No. 12/241,037, filed Sep. 30, 2008, now U.S. Pat. No. 8,219,407, issued Jul. 10, 2012, which Claims benefit of priority from U.S. Provisional Patent Application Ser. No. 61/017,121, filed Dec. 27, 2007, the entirety of which are expressly incorporated herein by reference.

U.S. patent application Ser. No. 15/694,430, filed Sep. 1, 2017, now abandoned, is a Continuation of U.S. patent application Ser. No. 14/921,780, filed Oct. 23, 2015.

1 BACKGROUND OF THE INVENTION

1.1 Field of the Invention

The present invention relates to systems and methods for controlling computer applications and/or processes using voice input. More precisely, the present invention relates to using a logical command processor to provide additional processing of a portion of the output of a speech recognizer which cannot be processed by the speech recognizer itself. Thus, the input and execution of complex commands in natural language is made possible.

1.2 Description of Related Art

Typically, the capability of speech recognition systems of the prior is limited to input of simple commands and dictation. More recent speech recognition systems enable some disambiguation of command input, however this disambiguation is more or less related to determining which application or process a command applies to. The input of complex commands can not be successfully achieved by these systems, or at best require multiple structured steps to complete a complex command input. Therefore, the input of complex commands which require multiple command elements meeting specific criteria is restricted and cannot be achieved with natural language input.

See, U.S. Pat. Nos. 5,974,413, 5,805,775, 5,748,974, 5,621,859, 6,208,972, 5,412,738, 5,668,929, 5,608,784, 5,761,329, 6,292,782, 6,263,311, 4,993,068, 5,901,203, 4,975,969, 4,449,189, 5,838,968, 5,812,437, 5,864,704, 5,970,457, 6,088,669, 3,648,249, 5,774,859, 6,208,971, 5,950,167, 6,192,339, 5,895,447, 6,192,343, 6,253,176, 6,233,559, 6,199,044, 6,138,098, 6,044,347, 5,890,122, 5,812,977, 5,685,000, 5,461,399, 4,513,189, 4,726,065, 4,766,529, 5,369,575, 5,408,582, 5,642519, 6212498, 7,286,988, 7,286,978, 7,283,959, 7,280,964, 7,277,854, 7,225,125, 7,203,646, 7,194,069, 7,139,714, 7,139,706, 7,137,126, 7,050,977, 7,039,166, 7,031,908, 7,028,306, 7,020,841, 7,016,830, 7,013,265, 7,003,079, 6,970,554, 6,964,023, 6,959,263, 6,937,705, 6,934,756, 6,934,684, 6,922,466, 6,915,254, 6,904,143, 6,898,277, 6,888,536, 6,885,734, 6,882,723, 6,879,685, 6,865,528, 6,839,896, 6,823,054, 6,804,330, 6,801,604, 6,735,560, 6,701,294, 6,665,640, 6,633,846, 6,622,119, 6,615,172, 6,606,598, 6,604,075, 6,598,022, 6,574,599, 6,532,444, 6,526,382, 6,513,063, 6,499,013, 6,490,560, 6,434,524, 6,405,170, 6,323,846, 6,314,402, 6,246,981, 6,173,266, 6,012,030, 5,878,406, 5,774,525, 5,748,841, 5,625,814, 5,608,624, 5,594,837, 5,434,777, 5,379,366, 5,321,608, 4,974,191 and 4,914,590, each of which is expressly incorporated herein by reference.

U.S. Pat. No. 7,286,988, incorporated by reference, discloses:

(79) According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database for storing retrieval key candidates that constitute a number of data that cannot be processed by the speech recognition processing in a prescribed processing time, as recognition target words in a speech recognition database, the recognition target words being divided into prioritized recognition target words that constitute a number of data that can be processed by the speech recognition processing in the prescribed processing time which have relatively higher importance levels based on statistical information among the recognition target words, and non-prioritized recognition target words other than the prioritized recognition target words, the computer readable program codes include: a first computer readable program code for causing said computer to request the user by a speech dialogue with the user to enter a speech input indicating the retrieval key, and carry out the speech recognition processing for the speech input with respect to the prioritized recognition target words to obtain a recognition result; a second computer readable program code for causing said computer to carry out a confirmation process using a speech dialogue with the user according to the recognition result to determine the retrieval key, when the recognition result satisfies a prescribed condition for judging that the retrieval key can be determined only by a confirmation process with the user; a third computer readable program code for causing said computer to carry out a related information query using a speech dialogue with the user to request the user to enter another speech input for a related information of the retrieval key, when the recognition result does not satisfy the prescribed condition; a fourth computer readable program code for causing said computer to carry out the speech recognition processing for the another speech input to obtain another recognition result, and adjust the recognition result according to the another recognition result to obtain adjusted recognition result; and a fifth computer readable program code for causing said computer to repeat processing of the second computer readable program code or the third and fourth computer readable program codes using the adjusted recognition result in place of the recognition result, until the retrieval key is determined.

(80) According to another aspect of the present invention there is provided a computer usable medium storing a data structure to be used as a speech recognition database in a speech recognition based interactive information retrieval system for ascertaining and retrieving a target information of a user by determining a retrieval key entered by the user using a speech recognition processing, the data structure comprising: retrieval key candidates that constitute a number of data that cannot be processed by the speech recognition processing in a prescribed processing time, as recognition target words, the recognition target words being divided into prioritized recognition target words that constitute a number of data that can be processed by the speech recognition processing in the prescribed processing time which have relatively higher importance levels based on statistical information among the recognition target words, and non-prioritized recognition target words other than the prioritized recognition target words.

(81) According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database for storing retrieval key candidates that are classified according to attribute values of an attribute item, the computer readable program codes include; a first computer readable program code for causing said computer to request the user by a speech dialogue with the user to enter a speech input indicating an attribute value of the attribute item for the retrieval key, and carry out the speech recognition processing for the speech input to obtain a recognition result indicating attribute value candidates and their recognition likelihoods; a second computer readable program code for causing said computer to select those attribute value candidates which have recognition likelihoods that are exceeding a prescribed likelihood threshold as attribute value leading candidates, and extract those retrieval key candidates that belong to the attribute value leading candidates as new recognition target data; a third computer readable program code for causing said computer to request the user by a speech dialogue with the user to enter another speech input indicating the retrieval key, and carry out the speech recognition processing for the another speech input with respect to the new recognition target data to obtain another recognition result; and a fourth computer readable program code for causing said computer to carry out a confirmation process using a speech dialogue with the user according to the another recognition result to determine the retrieval key.

(82) According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database having a plurality of statistically hierarchized databases for storing retrieval key candidates that constitute a number of data that cannot be processed by the speech recognition processing in a prescribed processing time, where lower level statistically hierarchized databases contain increasingly larger part of the retrieval key candidates such that a lowest level statistically hierarchized database contains all the retrieval key candidates, the computer readable program codes include: a first computer readable program code for causing said computer to request the user by a speech dialogue with the user to enter a speech input indicating the retrieval key, and carry out the speech recognition processing for the speech input with respect to all of the plurality of statistically hierarchized databases in parallel, to sequentially obtain respective recognition results indicating recognition retrieval key candidates and their recognition likelihoods; a second computer readable program code for causing said computer to select those recognition retrieval key candidates which have recognition likelihoods that are exceeding a prescribed likelihood threshold as recognition retrieval key leading candidates for each statistically hierarchized database for which the speech recognition processing is completed; and a third computer readable program code for causing said computer to control a next speech dialogue with the user according to whether a prescribed condition that a number of the recognition retrieval key leading candidates is less than or equal to a prescribed number but not zero is satisfied or not.

Similarly, U.S. Pat. No. 7,283,959, expressly incorporated by reference, discloses:

(28) Computer [ ] typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer [ ]. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

U.S. Pat. No. 7,031,908, expressly incorporated by reference, discloses:

(12) Prior to a detailed discussion of the present invention, an overview of an operating environment may be helpful. FIG. 2 [of U.S. Pat. No. 7,031,908] and the related discussion provide a brief, general description of a suitable computing environment in which the invention can be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium. In addition, those skilled in the art will appreciate that the invention can be practiced with other computer system configurations, including handheld devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

(13) With reference to FIG. 2 [of U.S. Pat. No. 7,031,908], an exemplary system for implementing the invention includes a general purpose computing device in the form of a conventional personal computer [ ], including a processing unit [ ], a system memory [ ], and a system bus [ ] that couples various system components including the system memory to the processing unit [ ] . . . . The personal computer [ ] further includes a hard drive [ ] for reading from and writing to a hard disk [ ], a magnetic disk drive [ ] for reading from or writing to a removable magnetic disk [ ], and an optical disk drive [ ] for reading from or writing to a removable optical disk such as a CD ROM or other optical media. The hard disk drive [ ], magnetic disk drive [ ], and optical disk drive [ ] are connected to the system bus [ ] by a hard disk drive interface [ ], magnetic disk drive interface [ ], and an optical drive interface [ ], respectively. The drives and the associated computer-readable media provide nonvolatile storage of computer readable instructions, data structures, program modules and other data for the personal computer [ ].

(14) Although the exemplary environment described herein employs the hard disk, the removable magnetic disk [ ] and the removable optical disk [ ], it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

As such, it is understood that a computer system according to the present invention makes use of a computer readable medium to store executable instructions to perform its functions.

2 SUMMARY OF THE INVENTION

2.1 Objects

It is therefore an object to provide a method for processing the output of a speech recognizer comprising: determining that a recognized command by a speech recognizer requires additional processing; storing a representation of the output of the speech recognizer in a command structure; iteratively determining if the command is sufficiently complete and ready for processing, and if so executing the command in a respective application or process and exiting said iteratively determining step; if the command is insufficiently complete or not ready for processing, prompting a user for further input; receiving, processing and storing in the command structure prompted user command-related input; and determining an abort condition, and if the abort condition exists, exiting the iterative determining, else continuing said iteratively determining step.

A command status with respect to at least one of a context, an entry in a commands dictionary and a status with respect to a status flag may be used to determine if a command requires additional processing. Likewise, an analysis of the speech input with respect to at least one of a context and a completeness may be used to determine if a command requires additional processing. The speech may be processed in a processing environment having a speech recognizer and a logical command processor, wherein the speech recognizer generates a first outcome, and wherein the logical command processor provides input to the speech recognizer to alter a statistical process, to produce a second outcome of the speech processing, and at least one of the first outcome and the second outcome are used for subsequent processing by the logical command processor. The speech recognizer may process speech input with both an HMM and context free grammars; and at least a portion of said speech processing is performed by a plurality of analyzers using context free grammars in parallel, each analyzer analyzing according to a different set of criteria. The representation of a speech input may be at least one of a set of potentially recognized words, a data matrix, a context based data construct, a command structure and a textual representation of the speech input. The speech may be processed in an environment having a speech recognizer software process and a logical command processor software process, wherein, upon determination that an input needs additional processing, at least a portion of an output of the speech recognizer software process may be further processed by the logical command processor software process. At least one of a non-linguistic implicit user input may be employed as a cue to influence processing by the logical command processor. At least one of a natural language analysis and a syntactic analysis may be used by the logical command processor to determine a context of a speech input.

It is another object to provide a method for processing a stored output of a speech recognizer comprising: determining a context of a speech input to a speech recognizer; and a) if the speech input is in the context of a command, then for each command present in the stored output; i) determining a set of elements required for executing the command; ii) determining if the stored output is sufficiently complete for executing the command, and if so executing the command in a respectively targeted application or process; otherwise: iii) prompting a user for further input and receiving, processing and storing subsequent user input until the stored output and stored subsequent user input are together sufficiently complete for execution of the command or until the process is aborted; and iv) if sufficiently complete for processing, executing the command in a respectively targeted application or process, and b) if the speech input is in the context of a data input, passing a representation of the stored output or an identifier thereof to a contextually appropriate data sink.

If the speech input is not a command or a data input, the user may be notified, and/or the user may be prompted for input. A command status with respect to at least one of a context, an entry in a commands dictionary and/or a status with respect to a status flag may be used to determine if a command requires additional processing. Likewise, an analysis of the speech input with respect to at least one of a context and a completeness may be used to determine if a command requires additional processing. The speech may be processed in a processing environment having a speech recognizer and a logical command processor, wherein the speech recognizer generates a first outcome, and wherein the logical command processor provides input to the speech recognizer to alter a statistical process, to produce a second outcome of the speech processing, and at least one of the first outcome and the second outcome are used for subsequent processing by the logical command processor. The speech recognizer may process speech input with both an HMM and context free grammars; and at least a portion of said speech processing is performed by a plurality of analyzers using context free grammars in parallel, each analyzer analyzing according to a different set of criteria. The representation of a speech input may be at least one of a set of potentially recognized words, a data matrix, a context based data construct, a command structure and a textual representation of the speech input. The speech may be processed in an environment having a speech recognizer software process and a logical command processor software process, wherein upon determination that an input needs additional processing, at least a portion of an output of the speech recognizer software process is further processed by the logical command processor software process. A non-linguistic implicit user input may be employed as a cue to influence processing by the logical command processor. A natural language analysis and/or a syntactic analysis may be used by the logical command processor to determine a context of a speech input.

It is a further object to provide a method for processing an output of a speech recognizer, comprising: (a) storing a representation of the output of the speech recognizer as a representation of the speech input in a memory; (b) determining if at least one command is present in the stored representation; (c) if at least one command is present in the stored representation, determining a context of the speech input; (d) if the speech input is not in context of a command, at least one of notifying a user, prompting the user for input, and passing a data input representing the stored representation to a contextually appropriate data sink; (e) if the determined context of the speech input is in a command context, then for each command present in the speech input: i) determining the elements required for processing each respective command; and ii) determining if the stored representation comprises all the elements required for executing the command, and if so executing the command; Otherwise: iii) prompting the user for further input and receiving and processing subsequent input from the user until aborted or the received and processed information renders the command sufficiently complete for execution; and iv) if a command becomes sufficiently complete for execution, executing the command in an appropriate application or process.

The speech may be processed in a processing environment having a speech recognizer and a logical command processor, wherein the speech recognizer generates a first outcome, and wherein the logical command processor provides input to the speech recognizer to alter a statistical process, to produce a second outcome of the speech processing, and at least one of the first outcome and the second outcome are used for subsequent processing by the logical command processor. The speech recognizer may process speech input with both an HMM and context free grammars; and at least a portion of said speech processing is performed by a plurality of analyzers using context free grammars in parallel, each analyzer analyzing according to a different set of criteria. The representation of a speech input may be at least one of a set of potentially recognized words, a data matrix, a context-based data construct, a command structure and a textual representation of the speech input. The speech may be processed in an environment having a speech recognizer software process and a logical command processor software process, wherein upon determination that an input needs additional processing, at least a portion of an output of the speech recognizer software process is further processed by the logical command processor software process. A non-linguistic implicit user input may be employed as a cue to influence processing by the logical command processor. At least one of a natural language analysis and a syntactic analysis may be used by the logical command processor to determine a context of a speech input.

It is another object to provide a method for processing speech, comprising the steps of:

(a) determining if an output of a natural language speech recognizer contains an available command; (b) if an available command is present, but sufficient explicit conditions are not fulfilled for processing of the command, performing a context sensitive process to at least one of:

(i) determine sufficient conditions for processing of the command, and presenting the command to a command processor for execution; (ii) determine that the output of the natural language speech recognizer represents data, and passing a representation of the speech input to an appropriate data sink; and (iii) prompt the user with a request for further input, wherein the prompting is automatically adapted to seek information from the user to at least one of increase a completeness and reduce an ambiguity of the available command.

It is another object to enable the processing of complex commands which require multiple parameters for successful processing. It is another object to utilize free text dictation and context free grammars to create an environment for inputting and processing complex multiple step commands in natural language. It is another object to provide a system which integrates the uses of HMM and context free grammars for contextual processing of commands and data input. It is another object to provide a method for receiving and processing speech input as data.

2.2 Summary of the Invention

The current invention seeks to overcome limitations of the prior art which inhibit the input of complex commands in natural language by providing a command processor which does additional processing on complex command input which cannot be resolved by a speech recognizer. The invention is not intended to replace speech recognition systems, or the mouse and keyboard for that matter, but rather seeks to augment the processing of speech input in order to overcome some of the obstacles that have impeded speech recognition systems from becoming mainstream.

In summary, one embodiment of the present invention is capable of processing speech input at two levels. Low level processing takes place using a speech recognizer for processing commands and data input from received speech. If the speech recognizer finds a command in the speech input and there is no ambiguity, then the command is processed. If there is ambiguity, then typically most of such ambiguity can resolved at this level. Likewise at this low level, when the speech input does not contain a command, the speech input or a representation thereof may be passed as data to an appropriate process or application. In current state of the art speech recognition technology, this low-level processing of speech is limited in its ability to process complex commands with multiple input parameters or complex speech input containing both commands and data input in the same string or even multiple commands. The present invention seeks to resolve these shortcomings.

The System functions as an interface enabling humans to exercise command and control over computer software applications and to input complex commands and information into multiple software applications by speech.

In addition to the low-level speech recognizer, a higher level of processing of a speech input is provided. This higher-level logical command processor relates more to manipulation of data than to speech recognition itself, and accordingly the processing of the speech input takes on a data flow architecture rather than a command architecture. In summary, the processing of speech input becomes a data driven process. The initial processing of speech input is performed by the lower-level speech recognizer, which processes a representation of speech input received. If a command recognized by the speech recognizer is determined to lack completeness, or determined to be a command that requires additional processing, a representation of the command and associated speech input are stored in a memory location for processing by a higher command processor. To resolve completeness, the user is prompted for missing data elements needed by the command, and if the response is appropriately related to the command, adding a representation of the subsequent user input to the memory location and repeating this process until the command structure is sufficiently complete for processing. Context can be resolved based on information about the command in a commands dictionary, or a command status associated with the command. In some embodiments, this high-level command processor can be used to process all speech input and to determines if a command is in the context of a process or an application, or if it is in context of a data input for a process or an application.

According to an aspect of the invention, a system and method for controlling a plurality of applications and processes by speech initiated commands spoken by a user is provided, each command having at least one phoneme, the steps comprising: receiving a speech input from a user, processing the speech input with a speech recognizer, such as a speech recognition engine or a speech-to-text engine (the STT), processing the speech input with the speech recognizer to determine if the speech input is a command, and if the speech input is a command resolving any ambiguity before going on.

Up to this point, the system functions like current state of the art speech recognition systems and in fact current systems may be adapted to the present invention. Such adaptation in a preferred embodiment takes place beyond this point, and the processing of speech input becomes a data driven process. Before going on to execute a command, the system determines whether the command is one that requires additional processing. At this point, other information about the command input can be determined, for example what elements of data are needed to process the command, and which such elements are present or missing. In a preferred embodiment, the system may refer to a commands dictionary for this information. It is noted that the Command Dictionary may be embodied in a data matrix or network, and therefore need not be a simple table entry or human-readable or human comprehendible format. The Command Dictionary may also be associated with disambiguation logic in the case where a plurality of available commands has conditions or states simultaneously satisfied by prior input. Alternatively, this information about the command may be determined from a registry or derived dynamically, for example by polling the target software construct for its requirements for executing the command. This step of determining required and available command elements can also be performed later in the process by the logical command processor, which makes this determination on subsequent input when processing a command.

If a command is determined not to require additional processing, the command is executed. If the system determines the command needs additional processing, a representation of the speech input corresponding to the command is store in memory location for processing by a logical command processor. An interim step of reprocessing the speech input under different criteria or with a different speech recognizer is optional at this point, and if utilized the main object of this step is to increase accuracy of the recognition of the speech input. Indeed, such a step might be employed in a speaker independent system, the speech input is reprocessed under different models e.g., US Eastern male, US Eastern female, lisp, stutter, non-native speaker, etc., taking the result with the best score in relation to parameters for the command, the object being to provide the most accurate possible representation of the speech input (or alternatively multiple representations) for the logical command processor to work with. In some embodiments, this reprocessing might be done on multiple processors.

A complex command is one that typically requires the command plus one or more data elements needed for successful processing of the command. For example, the command to make an appointment requires the command plus four elements of data, a contact name for the appointment, a date, a start time, and an end time. Other rules or criteria may be applied by the corresponding contact management software, and the system for processing the speech input must respect these rules if it is to be able to manage this command. Such criteria might include as requiring the contact to be one in the address book, the date being the current date or later, the start time being later than the current time and the end time being after the start time.

It is difficult for the average user to consistently input the command and all these elements by speech in a single natural language input. Even when all the elements are spoken correctly, recognition errors by the speech recognizer might result in one or more of the command elements not being recognized. This is a major impediment to enabling the speech input and processing of complex commands in natural language, and one which the present invention seeks to overcome.

Further, in a speaker independent system, the speech recognizer might be able to recognize a limited command set, but once the command is recognized, reprocessing of the speech input might be desirable and even necessary in order for the system to recognize other command elements needed for processing the command.

Typically, a command will require additional processing if it is flagged as such, if an entry in a commands dictionary indicates the command always requires additional processing, or if the system determines the command elements needed for successful execution of the command are not present or complete. For example, the "make an appointment" command is sufficiently complex that it might always be set for additional processing by the logical command processor, or the speech input associated with the command can be tested to determine if all its elements are complete.

Once the determination is made that the command requires additional processing, and any optional reprocessing is done, and a representation of the speech input stored in memory, the logical command processor takes over the command processing until the command input is aborted or the command input is sufficiently complete for command execution.

At the logical command processor level, based on the known information about the command and the command elements present in the representation of the speech input, the system prompts the user to input missing command information, receives the user input and parses the user input into the representation of the speech input, and this process continues until aborted or until the command structure is sufficiently complete for command execution. Thus, a user can input a complex command by speech, and is aided in completing the command input by the logical command processor. The output is then executed in the appropriate application or process for the command. It should be noted that once the logical command processor takes over processing of a command, the speech recognizer is used only to provide its output of a representation of subsequent speech input, and therefore the speech recognizer's function at this stage is similar to dictation.

Current state of the art speech recognition systems analyze speech input for a command first, and if a command is found the input is processed based on that command. Such systems are limited to the input of one command in a single speech input, and it is not possible to have multiple commands and data (such as dictation) present in the same input stream. In current systems, if an input stream contains two commands, once the first command is identified, the system doesn't get to the second command.

Another aspect of the invention is an alternate embodiment in which the speech recognition system is adapted at an earlier point in the process to allow recognition of more than one command. If one or more multiple commands require additional processing by the logical command processor, then each command and data element are processed accordingly by the logical command processor. In this alternate embodiment, an optional step of determining if a speech input is in the context of data or a command may be added, and a recognized command in the context of data can be processed as such without dependence on the logical command processor. A natural language model or syntactic analysis may be used to make this determination, and if this optional step is employed, it removes the current limitation of requiring a pause to precede and follow a command when the system is in a dictation context.

Yet another aspect of the invention is an alternate embodiment in which the system is adapted for a mode wherein all speech input is processed by the logical command processor. When this mode is not enabled, the system functions normally as in the preferred embodiment. When this mode is enabled, all speech input is processed by the logical command processor based on representations of the output of the speech recognizer.

While the preferred embodiment is used in a speech enabled operating system or an operating system running a speech recognizer, the invention lends itself to being embedded within devices which perform a specific function and in which the user experience is enhanced by controlling these devices in natural language. For example, the system can be embedded into an automobile and control systems such as the cruise control. In such an embodiment, the speech recognizer would recognize a command like set cruise control, and the logical command processor could determine if command elements like the speed and following distance are present, and if not prompt the user for the missing information. The same could apply to control of a car audio system to speech enable functions like volume control, band (AM, FM, Tape, or CD), the changing of stations or tracks. Likewise, the system could be embedded in a VCR or DVD recorder, with the commands being to record or play, and the command elements being the channel, the show and/or the recording times, and to omit commercials. When the system is embedded into devices with a narrow set of commands, the grammars used by the speech recognizer in recognizing the initial command may be sufficiently limited only to a basic set of commands, and the logical command processor thereafter may continue to provide a limited grammar to the speech recognizer in the process of acquiring missing command elements, such that the system be speaker independent.

3 DEFINITIONS

3.1 Grammar

"Grammars" are used by the speech recognition process to generate human readable and/or binary representations of allowable speech input corresponding to, and associating, actions and commands, the representations being used to functionally process the speech input, and to provide a framework for interpreting the commands. The grammars can be held within a command dictionary, discussed below, or dynamically generated by algorithm or other means.

3.2 Command

A "command" is defined as an instruction that can be acted upon, and may include parameters or associated data.

A command may be structured as a grammar and/or unstructured natural language input. A command may have an enabled or disabled state that may be acted upon based on external conditions.

An example of a command might be "Turn Lights On". An example of content might be text that we are dictating into a document in a word processing application, and in the context of that dictation, the spoken words "Mary asked John to turn the lights on" would be considered content.

3.3 Valid Command

A "valid command" is one that is both known and complete. The command matches a known command and the command elements needed to process the command are present in the speech input (the command is complete).

3.4 Command Element(s)

A "command element" is an element of data that is needed to process a command. For example, the command "open" needs something to open. Command parameter attributes are contained in the CD for each command.

3.5 The Command Types

Basic command types are defined below.
3.5.1 System Commands
System commands (like the command to launch an application) are executed by the System. An example could be "start word processing"
3.5.2 Application Commands
An application Command is processed by an application (like the command to save a file).

3.6 Commands Dictionary (CD)

The "Commands Dictionary" ("CD") is a persistent data structure or set of data structures that maintains commands and if applicable all the information related to the commands.

The CD may reside at a plurality of levels within a system, with respect to the speech recognition processes. A CD may act integrally with the speech recognition processes to bias the processing and ultimately the output, and thus represent a low level and/or statistical data structure which does not directly correspond to text or human-readable representations. A CD may also act at a higher level, with respect to resolved representations of speech input, such as text or decision tree data structures.

Derived representations of commands may be either rigid or flexible. For example, a grammar which permits the commands "yes" and "no" may be represented as follows:
  <grammar name=response>
  <command id=1>Yes</command>
  <command id=2>No</command>
  </grammar>
In order to minimize the processing needed to process commands at any given time, it may be desirable at times to restrict representations to a single grammar or a subset of all available grammars representing only commands that are currently available at the time, and to update the representations when there is a change in the commands available to the user. For example, when resolving the completeness of a command, the system may register only grammars related to appropriate responses based on the information required.

The system may use the commands dictionary to determine which command elements are required by a command and any rules associated therewith, and then use this information to analyze a speech input to determine which command elements are present and missing. A command status may also be kept in the command dictionary, for example to indicate whether or not the command is one which should always require additional processing by a logical command processor. Other information may be maintained in the CD to facilitate determination of whether or not a command needs additional processing, and to facilitate such additional processing.

In place of a commands dictionary or in conjunction therewith, the system may refer to a registry or user interface for this information, or may dynamically poll the target software construct for a command to determine this information.

3.7 Active Applications

An "active application" is a Software Application that has been started by the system and is running. The System can send data to and get data from an Active Application. It is important to note that an application does not need to be visible or have focus in order to be active, and that once the System starts an application, even though it may not have focus or may not be visible, it remains active until the system or the user closes it.

3.8 Current Command (CC)

The "Current Command" (CC) is defined as the command that the system is currently processing.

3.9 Current Command Application (CCA)

The "Current Command Application" (CCA) is defined as the application that is processing the current command, or part thereof. For example, some commands require the system to activate and give focus to an application that will receive input of data from the user, such as a word processing application that will receive dictation. If multiple applications share identical commands, when such a command is issued, it is typically executed in the CCA.

3.10 System State

The System State is where the system may be at any given moment, and for example, may consist of the Input Stream, the Data Construct, what application is the CCA, whether is has a facet and its position, the System Mode (content loop or not), a reference to the previous System State (thereby allowing a "stack" or stack type behavior) and any other contextual information.

The System State can be saved at any given point before the system switches states, enabling the system to suspend applications and processes and return to them later in the same state as they were before they were suspended.

3.11 Command Status

A command status "flag" which indicates how a command should be processed at a given point, or how the system should proceed based on a prior outcome. Likewise, a command status can be maintained in a commands dictionary, such as an entry indicating that the command always needs additional processing.

A command status flag is one means of determining if a command requires additional processing. A command can be flagged to always require additional processing by the logical command processor.

Other command status flags may be employed by the logical command processor during its processing of a command input, for example an "incomplete" or "complete" status flag.

Once a command is complete, a command status flag may be employed for determining if a command is processed by the system, or an application or process, and if so which application or process.

Once processed, a command status flag may be used to determine if a command was processed successfully or not, and such flags can be used in determining the next step taken by the system (e.g. wait for user input or prompt/notify the user before going on).

3.12 System Context

The System Context is used in part to determine how the system will process speech input. For example, the system may be in a context where all input is assumed to be a command, or may be in a dictation mode where if a command is not found in the speech input, the speech input is assumed to be dictation. This context may be determined based on the state of a graphical user interface, for example whether or not an application which accepts dictation is visible and has focus. The context may also be defined as "the type of data that the System expects at this point". In the preferred embodiment, the possible values for the System Mode are "Wait Mode", "Command Mode", or "Content loop", however alternate embodiments could have more, less or different types of modes.

3.13 Speech Input

Speech Input is defined as raw data that the system receives from an input device such as a microphone. The speech input is processed by a speech recognizer, and the output of the speech recognizer is used to process commands and data input. When a command input must receive additional processing by the logical command processor, a representation of the speech input is stored in a memory location, and subsequent speech input while under the control of the logical command processor is parsed into this representation.

3.14 Representation of Speech Input

This is the stored output of the speech recognizer, which may take the form of a data matrix, a context-based data construct, a command structure, a textual representation or other form on which the logical command processor can act upon.

3.15 Parsing

At the speech recognizer level, "parsing" is defined as adding complementary output to a previously stored representation of a speech input, for example in building a command structure while under the control of the logical command processor.

At the logical command processor level, "parsing" is the action of identifying the respective roles of words with respect to adjacent words to determine a context. Parsing is used in natural language modeling or in the syntactic analysis process

4 COMMANDS DICTIONARY OVERVIEW

4.1 Commands Dictionary

In a preferred embodiment, the system uses a "Commands Dictionary" (CD) to determine information about a command. Typical implementation, the commands dictionary is not a human readable, acoustically accessible or otherwise directly comprehensible distinct set of possible commands, but rather comprises a set of information which define a correspondence between an input and an intended command, and information for resolving completeness of a known command based on known command elements as indicated in the commands dictionary and command elements in a speech input associated with a command which has been identified in the speech input. As used herein, it is understood that a commands dictionary is this representation, and that the phrases "Command Dictionary" or "representation of the Command Dictionary" or CD are used interchangeably.

While the preferred embodiment the commands dictionary is maintained in persistent storage, it can be stored in any format typically used to store data that can be read by the system and applications, including but not limited to a file in its own format, a database file, XML file, table, or process registration database, or any other data structure which can be manipulated by a processor. Alternatively, the commands dictionary may be derived dynamically based on system context and changes to system context. Likewise, a commands dictionary maintained in persistent storage may be updated dynamically based on available commands or new commands which become available through the introduction of new applications or processes into a system.

Although a commands dictionary is the preferred means for determining information about a command, other means such as a command flag, an entry in a commands dictionary, a registry or polling an application or process to determine information about a command are some other possible means of achieving this determination.

The system may operate using a plurality of command dictionaries, each from a different source, but preferably the available command dictionaries at any time are processed to provide a single optimized decision space. However, the command is preferably provided in a form which facilitates this process as the context changes.

According to one example, a user seeks to make an appointment in a calendar program, which must be identified by the date and time, duration, location, participants (optional), confirmation details (optional), topic (optional), and follow-up (optional). The user begins by identifying the task, such as "make an appointment" or "new appointment" or "meeting" or other possible inputs. These may all be represented in the commands dictionary, or may be represented as a single entry which is referred to when one of the possible command terms is spoken and identified by the speech recognizer. When the system identifies this command, it must determine if this command is one which requires additional processing by the logical command processor. This determination may be made by referring to the commands dictionary to determine which command elements are required for this command and referring to a representation of the speech input to determine which command elements are present in the speech input. Alternatively, the determination may be made at this point by a command flag, or by reference to an entry in the commands dictionary which indicate that this command always requires additional processing; and the determination as to available and missing command elements may be made later in the process by the logical command processor, again by reference to the commands dictionary or other means for making this determination.

In summary, in the preferred embodiment, the system refers to the commands dictionary to determine which command elements are required for successful processing of a command, and uses this information to determine completeness or lack thereof in the process of prompting the user for the missing information needed to build a complete command structure.

The commands dictionary may also contain other information about a command, for example information such as what to do after a command is executed, or the post-command execution impact may be used to adapt the command processing for subsequent inputs.

4.2 Structure

The CD maintains relevant information about a command. These attributes may vary depending on the command, and may include but are not limited to the following:

1—Grammar
2—Command
3—Command Status (e.g., does this command always require additional processing by the logical command processor?
4—Context in which the command is relevant.
5—Command elements required for the successful processing of the command.
6—Impact on system after command execution.
7—A reference to another entry for cases where multiple commands must be executed sequentially for a given spoken command.

Depending on the needs of the system, alternate embodiments could utilize other parameters not discussed here.

4.3 Grammar

This entry contains information defining the grammar of the command.

In order to enhance the natural language processing capabilities of the system, the CD can hold multiple entries or series of entries for the same command, effectively having the side effect of maintaining "synonyms" for commands. For example, the user could say "Turn on the living room light", or "Living room light on", or "light up living room". The CD has entries for "turn on", "on", and "light up," and all these commands are equivalent and give the same result.

4.4 Command

When the System finds an entry in the CD that corresponds to a representation of the associated grammar or matching conditions with the recognized text in the incoming input stream related to the System or the relevant application, the value of this field identifies the target of the operation (command) that must be processed. In other words, a Command is the instruction a user wants the computer to process when the user inputs a command.

4.5 Command Status

The command status entry, if used, indicates whether a command must always receive additional processing by the logical command processor. Other command status information can also be contained in this entry.

4.6 Context in which the Command is Relevant

Because the same speech input may correspond to different commands in different applications, or represent a command which is available in a plurality of applications, if this entry is employed, it is used to identify the application(s) to which this command applies. It may also be employed in determining context in embodiments in which the system or the logical command processor determine context of a command word in a speech input (e.g., is the word in the context of a command or data input).

For example, consider the command open, which may be applicable to the system and many applications. Typically, the command is directed to an application based on system context, for example the application which has focus. However, this entry in the commands dictionary may point to another application or multiple applications in embodiments where it might be desirable to process the command in more than one application or process. Likewise, this entry may be used to limit the choices available to a user in subsequent input during the process of completing a command. This entry may also specify if an application must be visible or have focus as a condition to executing a command, or after command execution.

4.7 Command Elements Required for Successful Execution of the Command

This entry indicates the command elements, if any, must be present in the command structure for successful execution of the command.

For example, the command "Turn On" by itself is not sufficient. To process this command successfully, a command element indicating what to "turn on" must be present. When a command is found, the system uses this entry to determine what command elements, if any are required by the command, and with this information the system can test the speech input associated with the command to determine if the command element of something that can be turned on is present or not. If the command information is not complete, the information from this analysis is then used in seeking completion of a command structure. The entry may also specify that conditions which must be met by command elements, for example in the "make an appointment" command, a requirement for the ending time of the appointment might restrict valid end times to times later than the start time. Or the entry might indicate that two valid times are required without assigning a slot to either time during the input process, and when the command structure is complete selecting the earlier time as the start time and the later time as the end time.

4.8 Impact on System after Command Execution

If used, this entry may indicate whether an application remains open, visible or has focus after command execution, if the system returns to another application such as the previous application after command execution, or it could specify any desired post command execution state for the system.

4.9 a Reference to Another Command or Commands

This information is for cases where single command calls on multiple other commands to be processed. If employed, this entry enables the System to call another command or series of commands, or to link commands together. This enables the user to call a chain of commands with a single command, instead of inputting all the commands sequentially or in a single long string of speech input. An example of such a command is "Go to bed", which may turn off the lights, turn off the TV, turn down the heat, and set the alarm.

5 FUNCTION OF THE SPEECH ENABLED SYSTEM

5.1 Overview

The system comprises an operating system running a plurality of applications and processes, a speech recognizer and a logical command processor. Once the System is initialized, the System waits for a user speech input. When the system receives a user speech input, it is processed by a speech recognizer to determine if a command is present, and if so, resolves any ambiguity before moving on to determine if the command requires additional processing. If so, a representation of the speech input (the output of the speech recognizer) is used by the logical command processor until termination or successful completion and execution of the command.

5.2 Active VS Visible Applications

All applications that are activated (either in the System initialization process, or by command) remain active until closed. Since the System locates the applications for the user, it is not necessary for an application to be visible in order to process a command.

For example, one application can retrieve data from another application without displaying the other application, or a command (for example, "Turn on the kitchen lights") can be processed without displaying the application that controls the lights.

5.3 The Current Command

When the System determines that it has received a command, it is operating on that command, and the command can be referred to as the "current command" ("CC"). If the command is one that is for the system to process, it is referred to as a "system command." If the current command is an application command, then the application is referred to as the "current command application" ("CCA"). Typically, whether the system or an application act on a command is determined by the current system context; however, at the logical command processor level, information in the CD may indicate which application should be called on to process the command, and what parameters, if any, are required for appropriately processing the command. It should be noted that some commands impact only the system, while others require the system to interact with one or more applications.

If a command is intended to be processed by an application, and the appropriate application is not active, the System starts the application, and that application becomes the CCA and may be displayed in the graphic user interface and granted focus if required or appropriate for user interaction with the application. The CD may also indicate if the type of input the application accepts (e.g., command, command elements, data, etc.).

5.4 Complex Commands

Some commands require more information about what they should be acting upon, and the command input must include these command elements for successful completion and execution of these commands. These commands are called "complex" because they require other information in order to be complete. In the preferred embodiment, this information and its nature are maintained in the CD, and are used by the logical command processor to bring a command input to successful completion.

An example of a complex command is the "make an appointment" command discussed above and below.

5.4.1 Example: "Make an Appointment"

This example illustrates the power of the logical command processor's capability to validate complex commands by identifying and prompting for missing parameters. The complex command "make an appointment" that is handled by a "contact management" application has an entry in the CD that also indicates that it requires four parameters (although there could be other parameters) as follows:

The person's name.
The date of the appointment.
The start time of the appointment.
The end time of the appointment. The user may enter the command as: User: "Make an appointment with John Smith on Tuesday at 8:00 AM." However, in this case, the command is a known command (make an appointment) but the system has determined it requires additional processing, either because the command "make an appointment" is flagged to always require additional processing either by a command flag or an entry in a commands dictionary, or the system has determined that the ending date is not present in the speech input.

In this example, at the logical command processor level, the system will prompt the user for more information: System: "Please provide an ending time for your appointment."

When the user responds, the output of the speech recognizer is added to the command structure in the stored representation of the speech input. If the logical command processor determines the user has responded with a valid ending time (a time that is later than the start time of the appointment) the system will execute the command in the contact management application. If not, the logical command processor will continue to prompt the user for a valid ending time until one is provided or the command input is aborted.

There may also be other criteria required by that command, for example, the person's name being in the contact list, the date being equal to or later than the current date, the start time being later than the current time, and as discussed above, the end time being later than the start time. The system could also require other parameters or relationships of parameters as well.

Carrying this example further, when the user is prompted to supply an ending time, and responds with "eleven am," this will result in the command statement being validated and processed. But if the user responds with "Wednesday" or "seven am" that input does not meet the test for a valid ending time, and in the preferred embodiment the user would again be prompted to supply a valid ending time for the appointment. Similarly, the system tests other parameters in the same way, for example verifying that the contact's name is an entry in the contact manager, that the date of the appointment is the current date or later, and that if the appointment is on the current date the start time is later than the current time. Indeed, when building and registering the grammars with the speech recognizer at each step, the logical command processor may provide a limited grammar or set of grammars restricting the speech recognizer to a set of valid responses. As such only valid input will be recognized and parsed into the command structure in the representation of the speech input.

In summary, in the command example described above, the speech recognizer receives the incoming speech input and parses it into the command structure in the stored representation of the speech input, where it is analyzed and continues to be processed by the logical command processor to successful completion and executions. However, in one alternate embodiment, instead of, or in conjunction with the storing of a representation of the speech input in a memory location, the "make an appointment" command could open a dialog in the relevant application (in this example the contact manager), and the recognized and valid command elements could be passed to the contact manager as they are identified, with those items being flagged as complete.

In such an embodiment the data fields in the contact manager become the repository for the representation of the command elements in the speech input.

5.5 Complex Command Input

Complex command input is the input of multiple commands and data in a single string of speech input. Examples of complex command input are two commands and a data element in a single string of speech input. Other examples are multiple commands only and a single command and a data element together.

An example of a complex command input is a single string of speech input with the commands "open calendar and display today's appointments" which is two commands, one to open the calendar and the other to display today's appointments.

In one alternate embodiment to the invention, the system can process complex command input. For example, in response to that command, the logical command processor will result in the execution of a command to start the calendar application, and another command to the calendar application to "display today's appointments."

Another example of a complex command input (in this case one wherein two commands in a single speech input are processed in an application) is "save and print document" which, results in the current document in being saved (one command) and being printed (another command).

5.6 Processing Commands

5.6.1 Acquiring and Processing Speech Input

Typically, the analysis of information represented in speech input is performed using statistical model-based analysis of the speech (Hidden Markov Models, HMMs), to determine of the speech input contains a command. In the case of complex commands, where additional input is needed, the interaction with the user is handled through a higher-level process which augments the speech recognition process. For example, the command "make an appointment," requires subsequent user input of certain parameters in order to successfully process the command. Typically, this complex command structure cannot be processed efficiently using only a speech recognizer. A higher-level processing is provided by a command processor, and commands identified by the speech recognizer are tested to determine if they require additional processing with this command processor. This test can be for a command status or referring to a commands dictionary which indicates whether or not a command should always receive additional processing or receive additional processing under certain conditions, or by testing the command and the associated speech input for completeness. For example, a slot-filling approach can be used to determine if a command and its elements are sufficiently complete for processing (e.g., execution of the command for its intended purpose), and if they are not a representation of the speech input (the command and its elements) are stored in a memory location for further processing by the command processor.

In some embodiments, it may be desirable for all speech input to be processed with such a command processor. In these embodiments, the output of the speech recognizer resembles the function of dictation in that a representation of all speech input is stored in a memory location for subsequent analysis and processing.

Prior to additional processing of a command input, it may be desirable to reprocess the speech input under different criteria or using a different statistical model than the one used by the speech recognizer when originally recognizing the speech. In such embodiments, it may be desirable to process the speech with different speech recognizers using different statistical models, such as context free grammars. Bidirectional communication between the speech recognizer and the command processor may also be desirable such that the command processor determines or alters the criteria to be used by the speech recognizer in processing speech input.

Once the command processor has determined the required elements needed to process the command, and which elements are present or missing, the next step is to provide the speech recognition engine (e.g., the low-level speech recognizer) with representation of the missing information, and prompting the user to input the missing information. This is done by building and registering the applicable grammars with the speech recognizer. Subsequent interactions will continue to prompt the user to input missing information until all of the required input is satisfied, the command can then be processed. In this type of system, the speech is processed, and a decision is made, typically without a textual representation of the speech being employed, although in some embodiments the processing could be done on a textual representation.

According to one embodiment of the invention, logical processing of commands is principally conducted based on outputs from a speech recognition process which acts, for the purposes hereof, as an STT engine. That is, rather than statistically modeling speech at a low level in dependence on the particular available options and contexts, e.g., an HMM, and passing a restricted data flow, the speech input is converted to the extent possible into a representation thereof (optionally with chronological parameters), which then forms the basis of the subsequent logical processing.

A well-known paradigm for speech recognition is a Context-Free Grammar (CFG). This system does not constrain the input processing to a strictly predefined set of states, and thus may permit passage of a representation of the speech input to a high-level analyzer. In a preferred embodiment using this approach the representation is semantically parsed, and then analyzed using a natural language model at the higher system level, which then enables identification, validation and processing of the command in a context dependent manner. In this case, the command "make an appointment with John Doe on Tuesday at 10:30" corresponds to a command structure in the CD, which requires the elements of a contact, a date, a start time, and an ending time. The system determines a calendar application is needed to process the command, and that all the command elements are present with the exception of an ending time. The user is prompted in the higher-level process to supply an end time for the appointment, and when the user responds, the response is added to the data command structure in the representation and the command structure is again tested for completeness (for example the input from the user represents a valid time, one which is later than the start time).

Once it is determined all of the required command elements have been received, the command is executed.

In a high-level processing schema, a user input may be processed by acquiring the data from an input stream (for example the output of a speech recognition process or speech to text engine or the input from keyboard or mouse click), and a representation of the speech input is parsed into a memory location that resembles a command structure or data construct so that the system can act upon that data. The representation can be kept in a memory queue, a memory address, a register, an operating system pipe, a shared memory area, on a hard disk drive or any other means of passing data from an outside resource into a program. In instances where the system has been integrated together with the input stream processing program (for example, a speech recognition process, the input stream can be passed directly into the system in memory). In any case, the data elements received from the acquired input stream correspond to the data which is being supplied by the primary interface (i.e., in the preferred embodiment, the microphone providing input to the speech recognition process engine which in turn is processed and passed to the System as text or other type of input that is usable by the System).

A hybrid schema is also provided in which one or both of a statistical model and a context free grammar are synergistically employed to identify with high reliability the presence of certain predetermined elements of the speech input, while concurrently handling all elements. Typically, where the statistically biased model (e.g., HMM) produces an output indicating presence of the predetermined elements with high reliability, this output is used to constrain the unbiased process (e.g., CFG), while avoiding the need for multiple rounds of interaction as would be required by a system solely based on statistically biased models, which typically impose presumptions on the input stream. This method enables a system to manage and process complex command sequences. For instance, in the above "make an appointment" example, the command "make an appointment" is identified by the HMM, but the speech input may be reprocessed by the CFG to identify command elements, which can then be processed at a higher level by the logical command processor, and then acts on a representation of the output of the CFG, both the output of the HMM and CFG or a composite thereof. Based on processing of this representation, the system can interact with the user as necessary to more fully define and complete the command structure.

5.6.2 Parsing

Parsing as it relates to the invention has two aspects. When a command is determined to require additional processing by the logical command processor, a representation of the speech input is stored in a memory location. Subsequent speech input acquired in the course of completing a command input is parsed into this representation in order to build a command structure which can be analyzed and acted upon by the logical command processor. This differs from the parsing which may be done by the logical command processor in analyzing a command input, or determining the context of such an input as in some embodiments.

In embodiments where the logical command processor is used to determine the context of a command input, a natural linguistic model is used to parse the speech input into a context-based data construct in order to enable the system to determine if the possible command is within the scope of the adjacent words. The linguistic model is used to tag parts of speech (i.e., verbs, nouns, adjectives etc). However, in alternate embodiments, other forms of context-based analysis or linguistics models can be utilized. Parsing is well defined in the art, and need not be discussed in more detail here.

5.6.3 Processing the Command with the Logical Command Processor

Once a command or multiple commands is/are determined to require additional processing by the logical command processor, the required command elements are determined. In the preferred embodiment this is done by reference to a commands dictionary; however, as discussed above there are other ways in which this determination could be made, and this need not be repeated here.

Based on the determined command elements, the logical command processor determines which command elements are present in the representation of the speech input. If all the command elements required for completeness are present, the command is executed. Otherwise, the system builds and registers grammars with the speech recognizer for the missing command elements and the user is prompted for the missing command elements. This prompting can take place one element at-a-time, or all the missing elements can be requested in a single prompt. The system waits for and receives the subsequent user speech input, which is processed by the speech recognizer. If an abort, cancel or fail condition are not present in the input or otherwise triggered, for example by time or exceeding a predetermined number of loops, a representation of the applicable speech input is parsed into the command structure in the memory location maintaining the representation of the prior speech input. Speech input which is not applicable because if falls outside the scope of the relevant grammars is preferably ignored, although in some embodiments this determination of relevance may be made by the logical command processor. Additionally, the system may receive input from other input devices such as a keyboard, mouse or handwriting device, and this input is likewise added to the command structure in the representation of the speech input.

After receiving the user input in response to the prompt, the logical command processor again test the command structure in the representation of the speech input for completeness of the required command elements. If the command input is complete, the command is executed. If there are still missing command elements, the process of prompting, receiving, processing and analyzing subsequent input continues until either sufficient completeness for command execution is achieved or the command input is aborted by the previously noted abort, cancel or fail conditions.

Interaction between the logical command processor and the speech recognizer facilitates the process of building a command structure leading to a command input sufficiently complete for command execution. Creating a grammar (or multiple grammars) relevant to the input required and registering a representation of the grammar with the speech recognizer may serve to limit the possible input that will be accepted by the speech recognizer to the required command element(s) for which the user is being prompted, and perhaps to other available commands based on the system state. For example, under this schema, if the prompt is for a time and the user speaks a date, the date is not a valid time and the input is ignored. The logical command processor does this through each pass, and likewise the grammars registered with the speech recognizer may change each time the system state or user interface changes and/or or is refreshed. In some cases, the visible dialog menus of an application are dynamically organized. For example, Microsoft Office 2003 provides pull-down menus which include most likely or most frequently used options. In theory, by limiting the number of options, presented to the user, the search time to find the desire selection will decrease, while the ability of the user to target a desired selection or provide a desired input using the interface is enhanced by the limited number of choices. In like fashion, the logical command processor may provide and the speech recognizer(s) may employ a reduced or focused set of available choices, which will likely improve the discrimination between the choices and thus improve accuracy.

In some cases, the system may recognize circumstances where the available natural language or unconstrained choices will likely lead to ambiguity or a high error rate, for example where available choices are homophones either in general, or for the dialect of the user. In this case, the system may alter one or more of the presented choices to make them more linguistically distinct when both are available for selection, or to limit the available choices to exclude one or more of the choices which would lead to difficulties. If, indeed, the user seeks to make an input corresponding to an unavailable choice, a subsequent mode may be provided which then makes that choice (or, for example, all or a selection portion, of previously excluded choices) available, perhaps excluding in the subsequent round the problematic higher probability selection.

Typically, the user prompts are audio such as the output of a text-to-speech engine or visual in a graphic user interface, and indeed, the user interface may respond in real time to speech even before an input is completely received. Thus, for example, if the first one or few phonemes limit the possible inputs to one or a few, the interface may be modified to highlight the possible choices. In the case of a complex input, which is not immediately completed, the user may then be given the option to bypass the remaining input and accept as the input the most likely candidate, or provide input to distinguish between the now limited choices, which for example may be provided with an indicia such as "one" and "two". This schema does not provide substantial efficiencies for common simple commands, but may provide significant efficiencies for complex and/or obscure commands or complex input. Of course, the user is typically permitted to complete the speech input in accordance with the original context, so the use of this real-time feedback is optional.

Thus, the speech interface and the logical command processor may be responsive to changes in the visual user interface, but the visual user interface may be responsive to alterations in the status or context of the speech user interface. The interaction between these may be controlled at various levels, including the process, application, operating system or speech processing components. In the preferred case, the interaction is controlled at the operating system level, using application API features, and thus would be compatible with applications which are both intrinsically speech enabled and those which are not.

Based on the representations of the speech input the command structure and commands dictionaries, the logical command processor may therefore, at any time, restrict the speech recognizer to perform an analysis to determine predicted performance or statistical reliability, in the context of the available commands for recognition, the particular user (speaker), and the status of the system, and respond to this analysis by alterations in the application or process (e.g., visual display, audible prompts, etc.), the command dictionary itself (by forcing changes in the application(s) or process (es) to which the commands dictionaries relate), or, for example, the processing algorithms employed by the speech recognition system for processing the input. An example of the later is to convert from a speaker independent recognition algorithm to a speaker dependent algorithm, with possible training for at least particular speech patterns. Another possible outcome of the analysis is to present confirmation prompts to the user where the statistical reliability of the input (either retrospectively or prospectively) falls below a threshold, which may be predefined or adaptive. In some cases, the threshold for an added confirmation may depend, for example, on the clarity of the difference between the various results to the user, and therefore whether an error would be obvious, the damage resulting from an error, the ease in reversing the error, a relationship between the cost of a confirmation and the cost of an error, and the "flow" of user input.

According to one embodiment, parallel or concurrent execution of various possible inputs or commands is performed, in virtual workspaces, such that regardless of errors, one virtual workspace will maintain a correct state. Typically, there would be an exponential growth in the number of such virtual workspaces, so an analysis is made to determine whether a subsequent user input is likely inconsistent with a presumed prior input; in which case the virtual workspace may be eliminated in favor or those which have no such inconsistencies. Likewise, the user may be periodically prompted to confirm the correct state, which will allow a paring of the decision tree. This prompting may be focused on differences in the various parallel workspaces. Likewise, workspaces which are identical may be merged.

Extending the concept of parallel processing and virtualization, it is also possible to perform decentralized processing of speech recognition and likewise portions of the task performed by the logical command processor may also be decentralized or multiple decentralized logical command processors may be assigned portions of one or more tasks. For example, a speech input may be distributed from a master server to a pool of slave computers or available processing cores. Each processor could then process the input according to differing processing parameters, for example different dialects, sex, or impairments, e.g., US Eastern male, US Eastern female, lisp, stutter, non-native speaker. Upon reception of each processor result, the master server could then make a judgment call on which processor (s) produced the best result, or could pass the results to the logical command processor to make this determination. This scheme would provide a compromise between speaker dependence and speaker independence.

5.6.4 Resolving Commands Ambiguity

In some cases, a command found in a speech input may be valid in more than one application or process, or may be valid for the system and one or more applications or processes. When such command is found, ambiguity exists, because a valid command is identified and there is more than one possible target for this command. A typical speech recognizer may prompt the user and let the user choose which application to use in order to resolve this ambiguity. Alternately, the ambiguity may be resolved in favor of the application which has focus, or a system may be modified to enable the system decide which application to use by assigning an order in which applications will have the priority for processing such commands. Enabling the system to disambiguate is critical to successful processing of speech input, particularly when a command can be processed in more than one application (or the system and two or more applications). The disambiguation provided by subsequent user input, or alternately the specified order in which the system seeks to process the command determines with which application the command will be executed.

For example, a command may be valid only for the system, for the system and one or more applications, for only one application, or for more than one application. If the command is valid for one or more applications, the application may be active and have focus, may be active and visible, active and not visible, or not active.

The invention contemplates certain modifications which can be made to existing state of the art speech recognition systems, which enhance a system's ability to manage command ambiguity. When the speech recognizer finds a command which results in ambiguity, there are a number of possibilities. A command can be valid for the system and at least one application or process, or valid for multiple applications and processes. In automating the disambiguation process, some factors may be considered in determining the priority for determining a target in which to execute the command.

- If there is ambiguity, should the user be prompted to provide disambiguation information?
- If the command is valid for the System, should the system always have the priority at processing the command?
- If an application is the CCA, should it have priority over other applications? Should a visible active application have priority over a non-visible active application?
- Should an active application have priority over an inactive application?
- Should the system try executing the command or test execution in all possible targets to determine which is the appropriate or best target?

Determining the priority by considering each these questions (and possibly others) enables flexibility in designing how an embodiment of the system will manage ambiguity. In an embodiment of the system modified to manage ambiguity to at least some level, the system can implement the priority algorithm by answering yes to each of the questions above, and "the last" to the last question, although alternate embodiments could follow looser or stricter rules, or command-dependent rules, depending on the needs that the system is designed to meet.

5.6.5 Resolving Command Ambiguity vs. Resolving Command Completeness

It should be noted that resolving command ambiguity differs from resolving command completeness. Ambiguity in a command input might be resolved, and the resolution of such ambiguity may lead to a subsequent determination that the command then requires additional processing with the logical command processor.

Typically, disambiguation takes place at a lower level in the speech recognizer and involves a command that can be processed in more than one target, prompting the user to select a target for the command from among the possible targets, and executing the command based on the input provided by the user.

Whereas resolving completeness typically takes place at a higher level with the logical command processor and involves prompting the user for missing command elements in order to build a completeness, and executing command when the user has supplied all the necessary command elements to satisfy a minimum completeness.

5.6.6 Processing Complex Speech Input Containing Multiple Commands and/or Data Elements Typically, a speech recognition system is designed to accept one command per speech input. An alternate embodiment of the invention seeks to overcome this limitation by enabling processing of speech input containing multiple commands and/or data elements in a single speech input. Note that complex speech input differs from complex commands. The former has multiple commands in a single speech input stream, and the later refers to a single command with multiple command elements.

An example of complex speech input is a command statement like "open document (name) and show me today's appointments." The speech input contains commands for both a word processing application and a calendar application, and requires that a document be opened in the word processing application. An alternate embodiment of the system manages such complex input by deferring processing of the speech input stream and execution of commands to the logical command processor.

BRIEF DESCRIPTION OF THE SEVERAL VIEWS OF THE DRAWING

FIG. 1 shows a preferred embodiment of a speech recognition system adapted to enable additional processing of command input by a separate command processor. Complex commands which are flagged for additional processing either by a command flag, an entry in a commands dictionary or other means, or complex commands which are determined to have insufficient completeness for processing by the speech recognizer, are sent for additional processing by the command processor.

FIG. 2 corresponds to FIG. 1, and shows the structure of the command processor in which representations of command input received from a speech recognizer are processed as data elements and subsequent input received from the speech recognizer is used to build a command structure in the representation which is sufficiently complete for processing, thus making the input of complex commands in natural language possible.

FIG. 3 shows an embodiment of the speech recognition system of FIG. 1, further adapted to process input of multiple commands and data elements in a single occurrence of speech input; and to determine if a command is in the context of a data input and to process the command accordingly. This embodiment makes possible complex of both multiple commands and data in a single speech input in natural language.

FIG. 4 corresponds to FIG. 3, and shows another embodiment of the command processor adapted process complex command input. The command processor determines if command and data elements are present in the representation of the speech input, and further determines the context and completeness of command input. Each command and data element found in the representation of the speech input are processed accordingly so data elements are passed to the appropriate application or process as data and command elements are processed in conjunction with the speech recognizer to sufficient completeness for execution.

FIG. 5 shows an embodiment of the speech recognition system of FIG. 1 further adapted for a continuous mode of operation wherein when the system enters this mode all subsequent speech input is processed by a command processor (see FIG. 6). Otherwise, commands are processed by the speech recognizer unless commands are flagged for additional processing, or commands are determined to have insufficient completeness for processing, in which case they are processed by the command processor of FIG. 2 or 4 depending on the embodiment.

FIG. 6 corresponds to FIG. 5, and shows an embodiment of the command processor of FIG. 4 adapted to process all speech input as data elements. Speech input can contain multiple commands and data, and each element of the speech input is processed accordingly, thus enabling the processing of speech input as data.

DETAILED DESCRIPTION OF THE INVENTION

Typically, a speech recognition system is not adapted to process input of complex commands that require multiple elements of data for successful processing, and the instant invention seeks to overcome this problem. In a preferred embodiment, FIG. 1 shows a speech recognition system adapted to enable processing of commands as data elements by a separate command processor which is used to analyze command input and perform such additional processing leading to successful execution. Determination of which commands require additional processing in the command processor can be made by a number of means including but not limited to basing the determination on predetermined command status flags, an entry in a commands dictionary, predetermined conditions or a determination of insufficient completeness. Commands which do not require additional processing are processed by the speech recognizer as normal, and those which require additional processing are further processed by the command processor. This enables the input of complex commands in natural language, and in some embodiments enables speech input to contain multiple commands and data input elements in the same input. In one alternate embodiment, all speech input is processed by the analyzer, and the speech recognizer is used solely to provide the analyzer with a representation of the speech input for processing. Thus, in this alternate embodiment, the processing of speech input becomes a data process.

Moving on with FIG. 1, the speech analyzer is activated at S101, and appropriate grammars are loaded or refreshed based on the context of the system S102, for example available commands based at least on a user interface, or dictation mode. At this point, optionally, the user may be prompted for input S103 and the system waits for user input at S104. When the user provides input, the system receives the user input at S105. If termination is required at S106 the process terminates. Otherwise, the system goes on to process the speech input with the speech recognizer S107.

If the speech input is determined to be a command S109, the system goes on to determine ambiguity S113, and to resolve such ambiguity at S114. The steps of resolving the ambiguity at S114 are typically done by the speech recognizer, and may include prompting the user for input and receiving and processing the user input. The system may also resolve the ambiguity by other means, such as by predetermined conditions or an algorithm, as discussed below. If the ambiguity is not resolved at S115, then optionally, the user may be notified or prompted at S126, and the system returns to S102 to restart the process.

If at S109 the speech input is not a command, the system determines if the speech input is data for an application or process S119, and if so the data input is passed to the appropriate application or process as required at S124, and the system returns to S102 to repeat the process. If the speech input is not data, then optionally the user is prompted or notified at S120 before returning to S102.

Up to this point, the system functions, in many ways, as a typical speech recognizer, and beyond is where the system is adapted to enable determination as to whether a command needs additional processing by the command processor. This determination is made at S121, and if the command is determined to not require additional processing at this point, the command is executed at S116, and if the command executed successfully at S117 the system returns to S102 to repeat the process. If the command did not execute successfully at S117, then optionally the user may be notified or prompted at S118 before returning to S102.

The determination as to whether or not a command needs additional processing at S121 can be done by a number of methods and more than one method may be employed to make this determination, for example, such methods may be employed in parallel, concurrently. In cases where a method requires extensive processing, it may be advantageous to employ multiple processing cores. In one method some commands, particularly complex commands that require multiple data elements for successful processing, may have a command status flag or an entry in a commands dictionary which requires that the command always be processed by the command processor, or that the command be processed by the command processor under certain conditions. For example, a command to make an appointment in a contact management program requires at least for data elements to be present with the command, and a typical user is unlikely to always successfully speak the command and all the data elements in one sentence without omitting at least one element. Further, misrecognition by the speech recognizer can result in incomplete recognition of some command elements even if all the elements are spoken. Therefore, with complex command such as this, a particular command status may always require additional processing by the command processor.

In another method for making this determination, the command input is tested for all the elements required to execute the command. The logical command processor can be used for this purpose, or a separate analysis may be used. Once a command is identified, the system can use a number of means to make this determination. In some variations of the preferred embodiment, the storing of a representation of the speech input that takes place at S123, may take place before this step S121 to facilitate this analysis.

In one embodiment the system can refer to a commands dictionary to determine which command elements are required for a command to be complete and use a slot filling process to determine if all of those elements are present or not. Optionally at this step, a command which has a command status that always requires additional processing may also be tested, to determine completeness, and if the completeness is sufficient, the system may bypass additional processing and simply execute the command. Other methods such as an algorithm or a flag indicating which elements are required by a command may be employed in making the determination. The method or methods used are not restricted, and any method which determines whether or not a command requires additional processing is suitable.

If the command is determined to require additional processing at S121, then optionally the speech input may be reprocessed at S122. This step is optional, because the system may be able to proceed adequately with the original output of the speech recognizer. If this optional step is taken, the objective to increase the overall accuracy of the speech recognition process by analyzing the speech input under different criteria or even with different speech recognizers. In this step, if employed, the speech input can be reprocessed using different criteria than that originally used by the speech recognizer. These criteria may be predetermined by the system, dynamic based on the context of the system, or based on information about the command in a commands dictionary, for example. A different biasing algorithm or different speech recognizer may be used in this reprocessing. For example, if a speech recognizer using an HMM was used initially, another speech recognizer using context free grammars may be used to reprocess the speech input a second time. This may even involve the use of multiple speech recognizers using multiple layers of context free grammars, each processing the speech with a different set of criteria. After this optional reprocessing, the output with the highest score or an aggregate of multiple outputs may be provided for further processing of the command input.

Moving on from S121, or from S122 if the optional step of reprocessing the speech input was taken, a representation of the speech input is stored to a memory location at S123. This representation of the speech input will be used by the command processor to analyze the command structure to determine completeness and identify missing elements of the command input, and for prompting the user and processing of subsequent input until the process is aborted, or the command structure reaches a sufficient level of completeness to allow execution of the command. This stored representation of the speech input may comprise a data structure, a textual representation of the speech input, a context-based data construct, a data matrix or any form of data which can be analyzed and acted upon by a processor.

After a representation of the speech input is stored to a memory location S123, the system moves on to S124 which goes to S200 for additional processing of the speech input by the command processor. When the system returns from the command processor, it returns to S102 to repeat the process. Optionally, the system may notify or prompt the user at S118 before returning to S102.

Moving on to S200 at FIG. 2, the system determines if the command structure in the representation of the speech input is sufficiently complete for processing at S206. In other words, does the command structure in the representation of the speech input have all the necessary data elements needed for successful execution of the command? Typically, the system may refer to a commands dictionary to make determination of which command elements are required, and compare the required command elements to the available command elements to determine which command elements are present and which are missing. Another method may be a command status in which the command carries the information needed to determine the required command elements, and this information may be used in making the determination. The information used and the determination made at step 121 in FIG. 1 may also be used here.

In the first pass, the command input will typically fail the test at S206; however, this test must be performed in the first pass because it is possible that some commands which carry a command status that always requires further processing will be complete. For example, "the make an appointment" command where the command is flagged to always receive additional processing, where a user successfully input all the required elements in the first try.

If at S206 the command data is sufficiently complete for execution, the command is executed in the appropriate application or process at S207. If the command was executed successfully at S208, the system goes to S217 where it returns to S102, or optionally S118 in FIG. 1. If the command was not executed successfully at S208, the system may optionally notify or prompt the user at S209 before going to S217 and returning to S102, or optionally S118 in FIG. 1.

If at S206 the command data is not sufficiently complete for execution, the system moves on to S210 where the information used in prior steps to determine which command elements are incomplete or missing is used to build grammars for missing command elements, and those grammars are registered with the speech recognizer. At this point it may be desirable, but not required, to limit the grammars registered with the speech recognizer to a subset of grammars for the missing command elements and necessary system commands. At this step, it may also be desirable to have bi-directional communication between the command processor and the speech recognizer to influence the biasing by the speech recognizer based on the current context of the system, parameters for the particular command and/or the results of processing from previous input.

Moving on to S211, the user is prompted as required for the missing command elements. This may include a specific prompt for a specific data element, a prompt for all the missing data elements or a general prompt for input. The system waits for user input at S212, and when it receives the user input at S213, it processes the speech input, if any, with the speech recognizer at S214. If the user input is to cancel or abort the command input, or if there is an abort or fail condition at S215, the system may optionally notify or prompt the user at S209 before going to S217 and returning to S102, or optionally S118 in FIG. 1. An example of an abort or fail condition might be exceeding a predetermined time limit for processing in the command processor, or a predetermined number of cycles through the command processor.

If there is not an abort/fail/cancel condition at S215, the system parses the output of the speech recognizer in a representation of the applicable speech input into a memory location at S216. For example, if the user provided an applicable response of a missing command element, the element is added to the command structure in the memory location, and when the command is tested again at S206, that element will be satisfied.

Input not related to the current command input is typically ignored, however, a representation of all the speech input can be passed to the memory location and the determination of which elements are applicable made at S206. For example, a command may have a set of rules for its data elements which may be maintained in a commands dictionary or other applicable location. In the "make an appointment" example, possible rules for the command elements might be:

There must be a name and the name must be equal to the name of a contact in a contact list.

There must be a date, and the date must be equal to or later than the current date.

There must be two times, a start time and an end time, and the end time must be later than the start time. In the above example, if the missing element is the end time, if the user provides an end time earlier than the start time, then the response does not meet the required rules for the command and the response is ignored. Likewise, if the user provides a response that is not a valid time, the speech recognizer may ignore the response if the system has restricted the grammars to valid times. Otherwise, the command processor may ignore the response because it is not a valid time.

After S215, the system returns to S206, and the process is repeated until the command structure in the representation of the speech input in the memory location achieves a sufficient completeness for execution at S207 or the command input is terminated by an abort/fail/cancel condition.

The "make an appointment" command can be used to demonstrate how the preferred embodiment of the system functions. A user states the command "make an appointment with Paul Lagassey on April 24th at 2:10 pm". The speech recognizer identifies the command to "make an appointment" and determines it is associated with the contact management application, so there is no ambiguity, and the system continues. At this point the system determines the command must receive additional processing, either because it is flagged as such by a command status flag, an entry in a commands dictionary, or because the system has determined a command element, in this case the ending date for the appointment is missing. In the preferred embodiment, in making this determination, the system refers to an entry in the commands dictionary for the command "make an appointment" which is associated with the contact manager. This entry indicates the command requires four elements of data, a name, a date, a start time and an end time. The system determines that the speech input contains a name, a date and a start time, but that an end time is missing. Other parameters in the commands dictionary could be that the name must be in the contact manager contact list, the date must be the current date or later, and the end time must be later than the start time. Alternately, the requirement could be for two times, and the latter time could be assumed to be the end time. Having made the determination that the end time is missing, the logical command processor cause the user to be prompted for an end time. When the user provides the next input, the output of the speech recognizer is parsed into the representation of the speech input and the command structure is tested for a valid end time. If desired, the command processor can restrict the grammar provided to the speech recognizer for the next input to a series of valid times, and if the user does not provide a valid time the input will be ignored. After the prompt and user response, if the user has provided a valid end time, the command is executed in the contact manager. Otherwise, the prompting continues until a valid end time is obtained from the user or the command input is terminated.

Moving on to FIGS. 3 and 4 which show an alternate embodiment of the invention wherein the speech recognition process is further adapted to enable it to process input of multiple commands and data elements in a single occurrence of speech input; and to determine if a command is in the context of a data input at the speech recognition level and to process the command accordingly. Additional contextual analysis by the command processor is also incorporated. This alternate embodiment makes possible complex of both multiple commands and data in a single speech input in natural language.

FIG. 3 corresponds to FIG. 1 in the preferred embodiment, with the following adaptations.

At S109, the system is adapted to determine if the speech input contains at least one command, and to recognize multiple commands and data input in a single string of speech input. This enhancement enables the input of multiple commands and data elements together in a single speech input. For example, if a command is found in the speech input string, the remaining parts of the speech input string are reprocessed looking for commands first then data elements. Thus, the output of the speech recognizer can comprise multiple commands and data.

If at least one command is found in the speech input, then optionally, a representation of the speech input may be stored to a memory location at S110, following S109, instead of at S123. For example, the speech input may be stored in a context-based data construct to enable contextual analysis in optional step S112 if that step is to be employed.

Also optionally, following S109, the command(s) may be tested at S112 to determine if the command or commands are in the context of a data input, and if so to pass the command and relevant speech input as data to S119. This step is optional because other means such as the system state can be used to determine context, and such existing means for determining whether an input is a command or a data input are adequate for this purpose. If this optional step is employed, this contextual analysis further enables commands to be input in natural language, and removes the existing limitation of requiring silence before and after a command for determining whether a command word spoken by a user is a command or in context of a data input. This contextual analysis may be done using context free grammars, natural language modeling and syntactic analysis, and may employ a context-based data construct. In a variation of this alternate embodiment, it may be desirable to extract any data elements at this step or in place of this step if it is optionally omitted, so that the data elements of a speech input string are processed by the speech recognizer. If the system is adapted to this variation, then optionally the system may store only a representation of the speech input related to the command and command elements at steps S110 and S123, and the command processor may be adapted to omit processing of data input.

Step S121 is adapted so that if more than one command is contained in the speech input, each command element is analyzed and processed separately. Accordingly, in a speech input string containing two commands, one command may require additional processing at S124 and the other may meet conditions for execution and be executed at S116. Alternatively, the system may be set to always require additional processing of speech input containing more than one command, or it may do so selectively based upon a context.

Finally, step S123 is taken only if required, meaning if a representation of the speech input was not optionally stored at S110 earlier, or if the speech input was reprocessed at S122.

FIG. 4 corresponds to FIG. 2 in the preferred embodiment, with the following adaptations to enable the system to determine if command and data elements are present in the representation of the speech input, the context of the speech input, and the completeness of commands, and to perform processing on each identified command and data element. These adaptations are achieved in steps S201, S202, S204 and S205 as follows:

At S201 the command processor determines if command and data elements are present in the representation of the speech input, and for each command and data element the context of the speech input (for example command or dictation and the target for the element), the completeness of command, the required data elements needed for successful execution of the command, and the available and missing data elements for the command. Commands and data elements may already be identified and parsed by the output of the speech recognizer or at S212 in FIG. 3. The system may refer to a commands dictionary to make determination of context and which command elements are required, and compare the required command elements to the available command elements to determine which command elements are present and which are missing. Another method may be through a command status flag in which the command carries the information needed to determine the required command elements, and this information may be used in making these determinations. This step may also use the information from S121 in FIG. 3 in making these determinations, or may comprise a separate analysis or both. Subsequent to this step S201, the command processor processes each element (command(s) and data) in the representation of the speech input.

At S202 the system determines if a command is present. If a command is present the system goes on to S206, and otherwise to S204.

At S204, the system determines if data input is present. If the element is data, the system moves on to S205. Otherwise, the system goes to S216, or optionally S209 to notify or prompt the user.

At S205 the system passes data input to at least one application or process as required based on the determined target(s).

In this alternate embodiment, if a single string of speech input contains multiple elements of command and data input, the elements of input are processed in serial. After processing the first element of input (command or data input) the system determines if there is another element of input that needs to be processed at S216. If there is, the system goes back to S202 with the next element and continues the process until all elements of input have been processed. When all elements of input have been processed, the system goes on to S217 where it returns to S102, or optionally S118 in FIG. 3. In variations of this embodiment, the processing of multiple elements of input may be done in parallel, or in a stack of command processors, one command processor processing each data element. In such variations, the stacks of command processors may be independent or recursive.

The other steps of this FIG. 4 starting at S206 are the same as in FIG. 2, and need not be explained further here.

Moving on to FIGS. 5 and 6 which show an alternate embodiment of the invention wherein a system mode determines if speech input is processed by the speech recognizer supported by a command processor or if a command processor is used to process all speech input. Optional command activation statements may be used to change the system mode. Depending on the system mode, the command processor may have a different structure, or different command processors may be utilized in different system modes. If both speech and a command processor are being used to process speech input, then the command processor of FIG. 2 (or optionally FIG. 4) can be called from S124 as described in the description the respective figures above; and if the system mode is set for the command processor to process all speech input, the command processor of FIG. 6 is called from S131 as described below.

FIG. 5 corresponds to FIG. 3 in the first alternate embodiment, with the following adaptations.

The step S109 is adapted to S109 in FIG. 1 because S124 calls the command processor embodiment of S200 FIG. 2. A variation of this embodiment can adapt S109 to correspond to S109 in FIG. 3, and then S124 call the embodiment of command processor in S400 FIG. 4.

Optionally, at step S111, the system determines if the command is one to enter continuous mode, where all subsequent speech input is processed by the command processor, as described below and shown in FIG. 6.

If the command at S111 is to enter continuous mode, then at S131, the system enters the command processor S600 as described in FIG. 6, where all further speech input is processed by the command processor until the command processor is terminated, and when the system is in this continuous mode, the speech recognizer essentially acts as a dictation engine, storing a representation of its output to a memory location for processing by the command processor.

The optional step S112 of determining if the command(s) is in context of a data input is omitted in this embodiment because this test can be optionally done by the command processor S600 if desired. However, variations of this alternate embodiment may be designed to include a determination of command context at the speech recognizer level, as in S112 in FIG. 3.

Typically, a command to enter the command processor mode is the sole input at the time this command is issued. However, a variation of the system could store a representation of the speech input in a memory location prior to S132, and if so the entry point to FIG. 6 would have to contain a test to determine if an input is present or not, and in dependence on the determination the next step would either process the input or prepare the command processor for input.

While step S124 calls the command processor embodiment of S200 FIG. 2, a variation of this embodiment can modify S109 to correspond to S109 in FIG. 3, and S124 can call the command processor embodiment of S400 FIG. 4 instead.

FIG. 6 corresponds to FIG. 4 in the first alternate embodiment, with the following adaptations to enable continuous processing of speech input by the command processor. Most of these additional steps resemble the processing of speech when processing an incomplete command input in steps S210 to S216.

The system enters the command processor at new step S661. The following steps relate to acquiring speech input and acquiring the output of the speech recognizer for the command processor.

At S661, the system builds grammars based on the system context and registers the grammars in the speech recognizer.

At S662, the user is prompted for input as required.

The system waits for user input at S663.

When the user provides input, the system receives the input at S664.

At S665, speech input is processed with the speech recognizer.

At S664, a representation of the speech input recognized by the speech recognizer (the output of the speech recognizer) is stored in a memory location.

At S201a, processing of the representation of the speech input by the command processor begins. In this alternate embodiment S201a is adapted from 201 in FIG. 4 to process command elements and data elements as they are presented by the speech recognizer. At S201a the system determines if the representation of the speech input contains a command or data input, the context of the input (for example command or dictation and the target for the command or data input), and if it contains a command, the completeness, including required command elements and which elements are present and missing. Therefore, in this alternate embodiment, the command processor does not need to separate multiple command and data elements in a single speech input and process them separately. However, a variation of this embodiment can be adapted to do so, and then the command processor will process multiple elements of speech input in a single string as in S201 in FIG. 4. If this variation is employed, then a test for more elements of input as in FIG. 4 S216 must be added, with the flow either going to SS651 or S661

Following S201a, the system determines if the command processor must be terminated at S651. If the command processor must be terminated, the system goes to S271 and returns to S102 in FIG. 5. If a terminate condition does not exist, the process goes on to S202 where, with the exception of the following options S203, the remainder of the processing is as in the corresponding steps of FIGS. 4 and 2, and need not be explained further here.

Finally, optional step S203 is added to determine if a command is in the context of data input. If a command input is in context of a data input, the command word and its related data are passed to an appropriate application or process as required, and otherwise the system goes on to continue processing the command at S206.

Examples of alternate embodiments and variations thereof are not intended to be limiting, but to demonstrate the flexibility in which the System of the present invention can be structured and designed to function in order to perform its objectives, as they may vary according to system design or implementation. Having described the preferred and some alternate embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A speech processing system, comprising:
   a command dictionary embodied in a network or data matrix;
   an input configured to receive a natural language speech signal;
   at least one processor configured to:
      determine a context of the speech processing system with respect to at least one of an external condition and a prior input, based on at least a state of a user interface, the context being selected from a plurality of available contexts comprising at least one command input context, and at least one dictation input context wherein at least a portion of the natural language speech signal is interpreted as content; and
      in the at least one dictation input context:
         determine a set of command grammars selectively dependent on the network or data matrix of the command dictionary, which are consistent with the determined context;
         parse the received natural language speech signal according to at least one linguistic model associated with the determined set of command grammars;
         determine a completeness of the parsed received speech signal according to the at least one linguistic model; and
         generate a command message selectively dependent on the determination of completeness; and
   an output configured to communicate the generated command message.

2. The speech processing system according to claim 1, wherein the at least one processor is further configured to generate a prompt for information to resolve an incompleteness of the parsed received natural language speech signal according to the at least one linguistic model.

3. The speech processing system according to claim 1, wherein the at least one processor is further configured to detect a command activation statement in the received natural language speech signal, and to parse the natural language speech signal received after the command activation statement.

4. The speech processing system according to claim 3, wherein the at least one processor is further configured to change the determined context of the speech processing system selectively dependent on the command activation statement.

5. The speech processing system according to claim 1, wherein the at least one processor is further configured to concurrently parse the received natural language speech signal according to a plurality of linguistic models of a plurality of contextually-consistent command grammars.

6. The speech processing system according to claim 1, wherein the at least one processor is further configured to initiate a command based on the command message, and subsequently determine if the command initiated based on the command message is successfully processed.

7. The speech processing system according to claim 6, wherein the at least one processor is further configured to contingently process a subsequent received natural language speech signal dependent on whether the command is successfully processed.

8. The speech processing system according to claim 1, wherein the at least one processor is further configured to process, substantially without parsing according to at least one linguistic model associated with the determined set of command grammars, at least a portion of the received natural language speech signal in a dictation mode.

9. The speech processing system according to claim 1, wherein the at least one processor is further configured to control a graphic user interface dependent on the received natural language speech signal.

10. The speech processing system according to claim 1, wherein the at least one processor is further configured to generate a textual representation of the received natural language speech signal.

11. The speech processing system according to claim 1, wherein the at least one processor is further configured to interpret the received natural language speech signal according to a statistical natural language speech model.

12. The speech processing system according to claim 1, wherein the at least one processor is further configured to parse the received natural language speech signal according to a syntactic analysis process.

13. The speech processing system according to claim 1, wherein the at least one processor is further configured to determine a statistical reliability of a correspondence of the received natural language speech signal to each of a plurality of alternate command grammars.

14. A speech processing method, comprising:
   receiving a speech signal;
   determining a context of the received speech signal, based on at least a state of a user interface, the determined context being selected from a plurality of available contexts comprising at least one command input context, and at least one dictation input context wherein at least a portion of the natural language speech signal is interpreted as content; and
   in the at least one dictation input context:
      determining a set of contextually-consistent command grammars from a command dictionary embodied in a network or data matrix consistent with the determined context;
      parsing the received speech signal according to at least one linguistic model of the determined set of contextually-consistent command grammars with at least one automated processor;
      determining a completeness of the parsed received speech signal according to the at least one linguistic model of the determined set of contextually-consistent command grammars with the at least one processor; and
      generating a command message selectively dependent on the determination of completeness.

15. The method according to claim 14, further comprising generating a prompt for information to resolve an incompleteness of the parsed received speech signal according to the at least one linguistic model of the determined set of contextually-consistent command grammars.

16. The method according to claim 14, further comprising detecting a command activation statement in the received speech signal, and selectively parsing the speech signal received after the command activation statement.

17. The method according to claim 16, further comprising changing the determined context selectively dependent on the command activation statement.

18. The method according to claim 14, further comprising concurrently parsing the received speech signal according to each of a plurality of different linguistic models of a plurality of contextually-consistent command grammars.

19. The method according to claim 14, further comprising controlling a graphic user interface dependent on the received speech signal.

20. A non-transitory computer readable medium, storing therein instructions for at least one automated processor, comprising:

instructions for determining a context of a received speech signal, based on at least a state of a user interface, the context being selected from a plurality of available contexts comprising at least one command input context and at least one dictation input context; and in the command input context:

instructions for determining a set of contextually-consistent command grammars in the at least one command input context, from a command dictionary embodied in a network or data matrix consistent with the determined context;

instructions for parsing the received speech signal according to at least one linguistic model of the determined set of contextually-consistent command grammars; and instructions for determining a completeness of the parsed received speech signal according to the at least one linguistic model.

* * * * *